(12) United States Patent
Tanaka

(10) Patent No.: US 10,023,047 B2
(45) Date of Patent: Jul. 17, 2018

(54) FOUR-WHEEL VEHICLE

(71) Applicant: YAMAHA HATSUDOKI KABUSHIKI KAISHA, Iwata-shi, Shizuoka (JP)

(72) Inventor: Tatsuya Tanaka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/598,337

(22) Filed: May 18, 2017

(65) Prior Publication Data

US 2017/0334285 A1 Nov. 23, 2017

(30) Foreign Application Priority Data

May 23, 2016 (JP) ................................. 2016-102555

(51) Int. Cl.
*B60K 15/035* (2006.01)
*B60K 15/04* (2006.01)

(52) U.S. Cl.
CPC .... *B60K 15/03519* (2013.01); *B60K 15/0406* (2013.01); *B60K 2015/0477* (2013.01)

(58) Field of Classification Search
CPC .......... B60K 15/03519; B60K 15/0406; B60K 2015/0477
See application file for complete search history.

(56) References Cited

U.S. PATENT DOCUMENTS

| 4,799,565 | A | * | 1/1989 | Handa | B60K 15/04 180/296 |
| 5,330,028 | A | * | 7/1994 | Handa | B62K 5/01 180/219 |
| 5,392,804 | A | * | 2/1995 | Kondo | B60K 15/03519 123/519 |
| 5,474,048 | A | * | 12/1995 | Yamazaki | F02M 25/0872 123/519 |
| 5,687,778 | A | * | 11/1997 | Harris | B60K 15/0406 137/43 |
| 6,029,635 | A | * | 2/2000 | Sekine | B60K 15/035 123/516 |
| 6,276,387 | B1 | * | 8/2001 | Pachciarz | B60K 15/035 123/516 |
| 6,405,747 | B1 | * | 6/2002 | King | B60K 15/03519 137/202 |
| 6,805,214 | B2 | * | 10/2004 | Maeda | B62J 35/00 180/220 |
| 6,851,499 | B2 | * | 2/2005 | Yagisawa | B62K 19/46 180/219 |
| 7,028,800 | B2 | * | 4/2006 | Yagisawa | B62J 1/12 180/219 |

(Continued)

FOREIGN PATENT DOCUMENTS

JP 2002-225576 A 8/2002

*Primary Examiner* — Jacob B Meyer
(74) *Attorney, Agent, or Firm* — Keating and Bennett, LLP

(57) ABSTRACT

A four-wheel vehicle includes an engine at least a portion of which is located farther forward than a seat, a fuel tank located above the engine and forwardly of the seat, a fuel filler including a fuel filler neck and a filler cap, a breather channel connected to the fuel filler, and an outflow prevention valve in the breather channel to prevent outflow of liquid fuel. The outflow prevention valve is located higher in a side view of the vehicle body than both of a lower end of the fuel tank and an upper end of the engine.

23 Claims, 16 Drawing Sheets

(56) References Cited

U.S. PATENT DOCUMENTS

| | | | | |
|---|---|---|---|---|
| 7,484,766 | B2* | 2/2009 | Iwasaki | B62J 35/00 180/219 |
| 7,533,904 | B2* | 5/2009 | Koike | B62J 35/00 280/833 |
| 7,624,829 | B2* | 12/2009 | Kubota | B60K 15/073 180/69.4 |
| 7,661,714 | B2* | 2/2010 | Kubota | B62J 35/00 280/833 |
| 7,681,920 | B2* | 3/2010 | Iwasaki | B62J 35/00 180/219 |
| 8,042,636 | B2* | 10/2011 | Hanafusa | B60K 11/04 180/292 |
| 8,047,324 | B2* | 11/2011 | Yao | B62K 5/01 180/296 |
| 8,851,523 | B2* | 10/2014 | Shiina | B62K 5/01 180/233 |
| 8,870,226 | B2* | 10/2014 | Inaoka | B60K 15/01 280/833 |
| 9,126,648 | B2* | 9/2015 | Nishimura | B62J 35/00 |
| 9,724,989 | B2* | 8/2017 | Nakamura | B60K 5/00 |
| 9,809,110 | B2* | 11/2017 | Nakamura | B60K 15/03519 |
| 2002/0112907 | A1* | 8/2002 | Maeda | B62J 35/00 180/69.4 |
| 2007/0023218 | A1* | 2/2007 | Koike | B62J 35/00 180/219 |
| 2012/0312619 | A1* | 12/2012 | Inaoka | B60K 15/01 180/219 |
| 2016/0185211 | A1* | 6/2016 | Nakamura | F02B 61/02 180/233 |
| 2017/0334285 | A1* | 11/2017 | Tanaka | B60K 15/03519 |
| 2017/0334286 | A1* | 11/2017 | Tanaka | B60K 15/03519 |

* cited by examiner

FOUR-WHEEL VEHICLE

CROSS REFERENCE TO RELATED APPLICATIONS

This application claims the benefit of priority to Japanese Patent Application No. 2016-102555 filed on May 23, 2016. The entire contents of this application are hereby incorporated herein by reference.

BACKGROUND OF THE INVENTION

1. Field of the Invention

The present invention relates to a four-wheel vehicle including a fuel tank that stores volatile fuel.

2. Description of the Related Art

In some cases, vehicles using volatile fuel such as gasoline includes a breather channel connected to the fuel tank to adjust the internal pressure of the fuel tank (for example, Japanese Patent Laid-Open No. 2002-225576 (JP-A-2002-225576)). When the vehicle tilts greatly, liquid fuel in the fuel tank may reach the breather channel. With respect to these problems, the all-terrain vehicle of JP-A-2002-225576 includes a check valve installed near the breather channel in order to suppress the liquid fuel in the breather channel from being discharged to the outside.

In the vehicle of JP-A-2002-225576, the fuel tank is disposed under the seat, and the check valve is attached to a frame located above the fuel tank. Such an arrangement of the valve makes the position of the valve above the fuel tank and thus may effectively prevent the outflow of liquid fuel from the fuel tank. However, JP-A-2002-225576 does not disclose an arrangement of the valve in vehicles including a fuel tank having a relatively high position. In particular, JP-A-2002-225576 does not disclose an arrangement of the valve in vehicles including a fuel tank located above the engine.

SUMMARY OF THE INVENTION

Preferred embodiments of the present invention provide a four-wheel vehicle including a fuel tank located above the engine and an appropriate location of a valve that prevents outflow of liquid fuel.

A four-wheel vehicle according to a preferred embodiment of the present invention includes right and left front wheels; right and left rear wheels; a vehicle frame; a seat that a driver sits on; an engine at least a portion of which is located farther forward than the seat; a fuel tank located above the engine and forwardly of the seat; a fuel filler including a fuel filler neck of the fuel tank and a filler cap that closes a filler opening of the fuel filler neck; a breather channel connected to the fuel filler; and an outflow prevention valve in the breather channel to prevent outflow of liquid fuel, the outflow prevention valve being located, in a side view of the vehicle above both of a lower end of the fuel tank and an upper end of the engine. According to this four-wheel vehicle, the outflow prevention valve is located in an appropriate position.

In a preferred embodiment of the four-wheel vehicle, the outflow prevention valve may include an inlet port into which vaporized fuel flows from the fuel tank, and an outlet port from which the vaporized fuel flows, and at least the outlet port is located above a liquid level of liquid fuel when the liquid fuel is filled in the fuel tank to a maximum amount. This arrangement effectively prevents liquid fuel from passing through the outflow prevention valve.

In a preferred embodiment of the four-wheel vehicle, the outflow prevention valve may include an inlet port into which vaporized fuel flows from the fuel tank, and an outlet port from which the vaporized fuel flows, and at least the outlet port is located above a center of the fuel tank in an up-and-down direction thereof.

In a preferred embodiment of the four-wheel vehicle, the outflow prevention valve may include an inlet port into which vaporized fuel flows from the fuel tank, and an outlet port from which the vaporized fuel flows, and at least the outlet port is located above the lowest portion of an upper surface of the seat.

In a preferred embodiment of the four-wheel vehicle, the outflow prevention valve may be located farther leftward than a right end of the fuel tank and farther rightward than a left end of the fuel tank. This arrangement effectively utilizes the space on the upper side of the fuel tank for the outflow prevention valve.

In a preferred embodiment, the four-wheel vehicle may further include a steering bar that steers the front wheels, wherein the outflow prevention valve is located below the steering bar.

In a preferred embodiment, the four-wheel vehicle may further include a steering system supporting a steering bar that steers the front wheels, wherein the outflow prevention valve is mounted on the steering system. This arrangement provides a sufficient length of a channel (tube) from the fuel filler to the outflow prevention valve.

In a preferred embodiment of the four-wheel vehicle, the outflow prevention valve may be mounted on a portion of the steering system that rotates together with the steering bar.

In a preferred embodiment of the four-wheel vehicle, the steering system may include a steering column and a support rotatably supporting the steering column, and the outflow prevention valve may be mounted on the support. This arrangement maintains the outflow prevention valve and channel in a stable position even when the steering bar rotates.

In a preferred embodiment of the four-wheel vehicle, the outflow prevention valve may be mounted on one of a portion of the vehicle frame located farther forward than the fuel tank and a carrier located farther forward than the fuel tank. This arrangement provides a sufficient length of a channel (tube) from the fuel filler to the outflow prevention valve.

In a preferred embodiment of the four-wheel vehicle, the outflow prevention valve may be mounted on one of a portion of the vehicle frame located farther rearward than the fuel tank and a carrier located farther rearward than the fuel tank. This arrangement provides a sufficient length of a channel (tube) from the fuel filler to the outflow prevention valve.

In a preferred embodiment of the four-wheel vehicle, the vehicle frame may include a tank support frame supporting the fuel tank, and the outflow prevention valve may be mounted on the tank support frame.

In a preferred embodiment of the four-wheel vehicle, a canister may be provided on the breather channel, the canister may be located at a position downstream of the outflow prevention valve, and the canister may be located below the outflow prevention valve. This structure reduces the amount of the vaporized fuel to be discharged to the outside.

In a preferred embodiment of the four-wheel vehicle, the canister may be located below an upper end of the engine.

According to another preferred embodiment of the present invention, a four-wheel vehicle includes right and left front wheels; right and left rear wheels; a vehicle frame; a seat on which a driver sits; an engine at least a portion of which is located farther forward than the seat; a fuel tank located above the engine and forwardly of the seat; a fuel filler including a fuel filler neck of the fuel tank and a filler cap that closes a filler opening of the fuel filler neck; a breather channel connected to the fuel filler; and an outflow prevention valve in the breather channel to prevent outflow of liquid fuel, the outflow prevention valve being mounted on the fuel tank. According to this vehicle, a worker is able to attach the fuel tank and the outflow prevention valve together in a process before mounting the fuel tank on the vehicle frame. As a result, the assembly of the vehicle is facilitated.

In a preferred embodiment of the four-wheel vehicle, the fuel tank may be made of a resin, for example. This contributes to a weight reduction of the fuel tank.

In a preferred embodiment of the four-wheel vehicle, the breather channel may include a breather tube, wherein the fuel filler includes a connector tube connected to the breather tube, and the breather tube extends from the connector tube to the outflow prevention valve and over at least 180 degrees around the fuel filler. This arrangement reliably provides a sufficient length of a channel (tube) from the fuel filler to the outflow prevention valve.

In a preferred embodiment of the four-wheel vehicle, the breather channel may include a breather tube, wherein the fuel filler includes a connector tube connected to the breather tube, and the fuel filler includes a guide portion holding the breather tube. This structure reduces the movement of the breather tube without increasing the number of parts.

In a preferred embodiment of the four-wheel vehicle, the breather channel may include a breather tube, wherein the fuel filler includes a connector tube connected to the breather tube, the connector tube extends from the fuel filler in a radial direction of the fuel filler, and a distal end of the connector tube is located above a proximal portion of the connector tube. This structure returns the liquid fuel in the connector tube to the fuel tank by utilizing gravity.

In a preferred embodiment of the four-wheel vehicle, the outflow prevention valve may include an inlet port into which vaporized fuel flows from the fuel tank, an outlet port from which the vaporized fuel flows, and located such that the outlet port is positioned above the inlet port. This arrangement prevents the liquid fuel from passing through the outflow prevention valve.

According to another preferred embodiment of the present invention, a four-wheel vehicle includes right and left front wheels; right and left rear wheels; a vehicle frame; a seat on which a driver sits; an engine at least a portion of which is located farther forward than the seat; a fuel tank located above the engine and forwardly of the seat; a fuel filler including a fuel filler neck of the fuel tank and a filler cap that closes a filler opening of the fuel filler neck; a vapor-liquid separation chamber inside the fuel filler and partitioned from a fuel storage space of the fuel tank; a breather channel connected to the vapor-liquid separation chamber; and an outflow prevention valve in the breather channel to prevent outflow of liquid fuel. This vehicle reduces the liquid fuel from reaching the breather hole, and thus facilitates selecting the location of the outflow prevention valve.

In a preferred embodiment of the four-wheel vehicle, a breather hole may be provided at an inner surface of the fuel filler neck, wherein the breather channel opens to the inside the fuel filler neck through the breather hole, the breather channel extends from the fuel filler neck in a radial direction of the fuel filler neck, and the vapor-liquid separation chamber extends along the inner surface of the fuel filler neck.

In a preferred embodiment of the four-wheel vehicle, a cylindrical member may be provided inside the fuel filler neck, and the vapor-liquid separation chamber is defined by the cylindrical member and the inner surface of the fuel filler neck. This structure enables the vapor-liquid separation chamber to be easily located inside the fuel filler neck.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
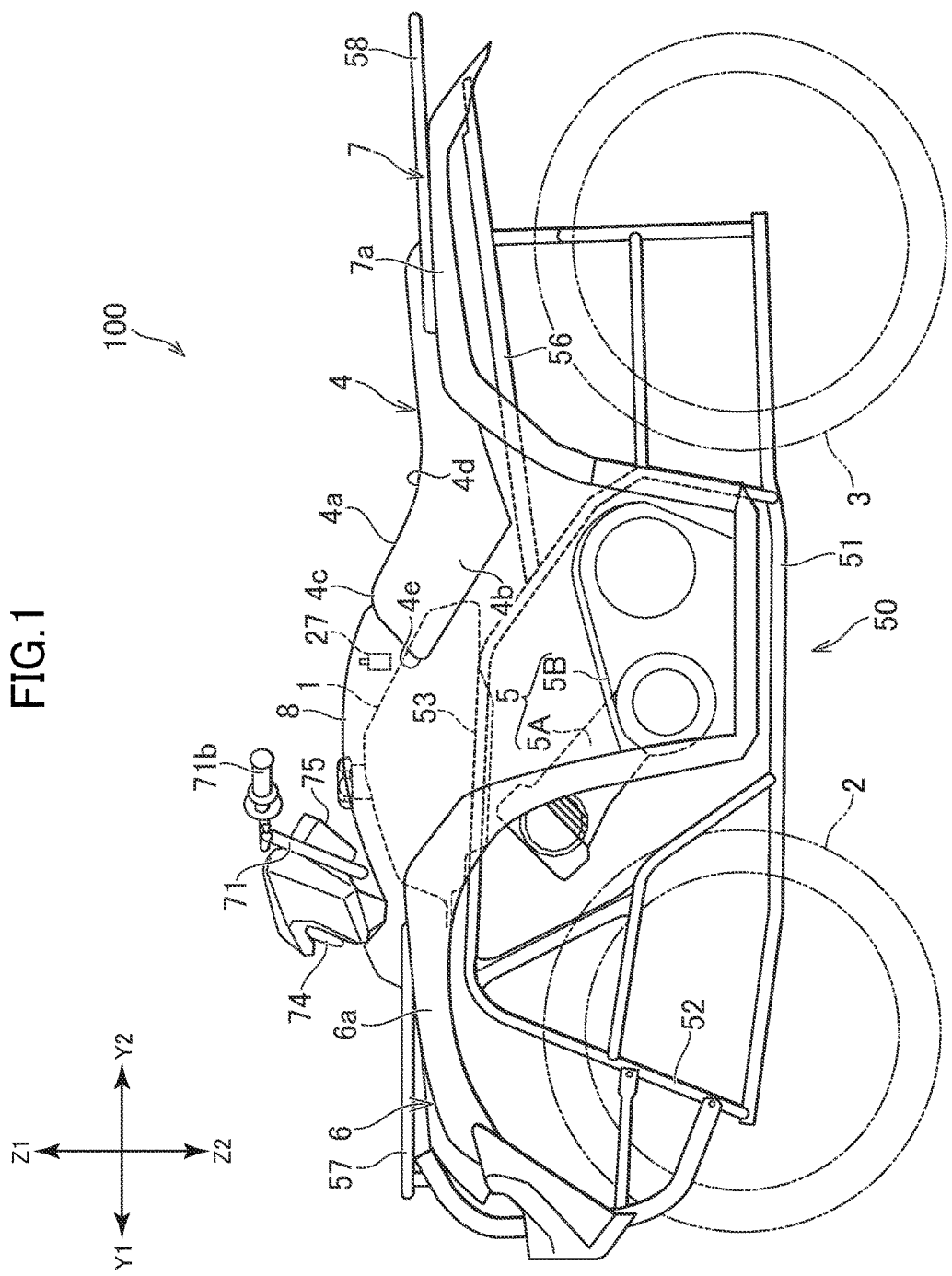
FIG. 1 is a side view showing an all-terrain vehicle which is an example of a four-wheel vehicle according to a preferred embodiment of the present invention.

Various preferred embodiments of the present invention will be described. The terminology used herein is for the purpose of describing particular preferred embodiments only and is not intended to be limiting of the present invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" "comprising" "includes" and "including" when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one having ordinary skill in the art to which the present invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing various preferred embodiments of the present invention, it should be understood that a number of techniques are disclosed. Each of these has individual benefit and each can also be used in conjunction with one or more, or in some cases all, of the other disclosed techniques. Accordingly, for the sake of clarity, this description will refrain from repeating every possible combination of the individual techniques in an unnecessary fashion. Nevertheless, the specification and claims should be read with the understanding that such combinations are entirely within the scope of the present invention and the claims.

In the following description, for purposes of explanation, numerous specific details are set forth in order to provide a thorough understanding of various preferred embodiments and modifications of the present invention. However, the present invention may be practiced without these specific details.

The present disclosure is to be considered as an exemplification of the present invention, and is not intended to limit the present invention to the specific preferred embodiments or modifications thereof illustrated by the figures or description below. Hereinafter, "all-terrain vehicle" will be referred to as "ATV". A vehicle including a seat 4 at the center of the vehicle body in the lateral direction will be described in the present specification, but preferred embodiments and modifications of the present invention may be applied to a vehicle including seats at the right and left areas of the vehicle body.

In the following description, Y1 and Y2 shown in FIGS. 1 and 2 will be referred to as front and rear, respectively. Z1 and Z2 will be referred to as upward and downward, respectively. X1 and X2 shown in FIG. 2 are referred to as right and left, respectively.

Figure 2:
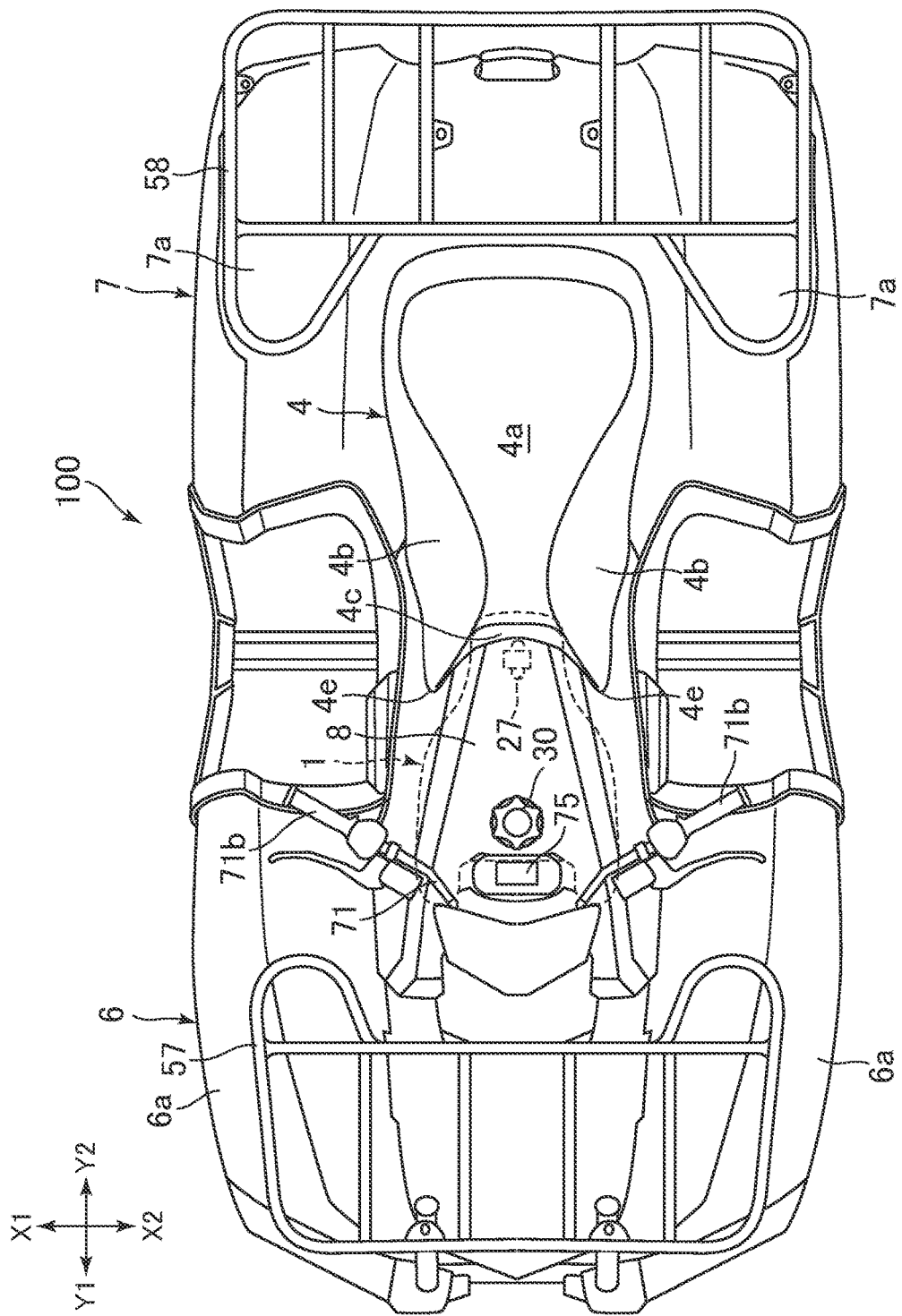
FIG. 2 is a plan view of the all-terrain vehicle shown in FIG. 1.

As shown in FIG. 1 and FIG. 2, the ATV 100 includes right and left front wheels 2 in the front portion of the vehicle body. The front wheel 2 is supported by a suspension (not shown) connected to the front portion of the vehicle frame 50 so as to move up and down. A steering bar 71 for a driver to steer the front wheels 2 is disposed in the front portion of the vehicle body. The front wheels 2 and the steering bar 71 are connected to each other so that they turn integrally to the left and right. A grip 71b is disposed at an end portion of the steering bar 71. The ATV 100 includes a front cover 6 in the front portion of the ATV 1. The front cover 6 includes fenders 6a covering the upper sides of the front wheels 2. The ATV 100 includes right and left rear wheels 3 in the rear portion of the vehicle body. The rear wheel 3 is supported by a suspension (not shown) connected to the rear portion of the vehicle frame 50 so as to move up and down. The ATV 100 includes a rear cover 7 in the rear portion of the ATV 100. The rear cover 7 includes fenders 7a covering the upper sides of the rear wheels 3.

An engine 5 is mounted in a middle portion of the vehicle body (that is, a portion between the front wheels 2 and the rear wheels 3 in the front-rear direction). The engine 5 includes a cylinder portion 5A. The cylinder portion 5A includes a cylinder body in which a cylinder is provided, a cylinder head attached on the upper side of the cylinder body, and a head cover attached on the upper side of the cylinder head. Further, the engine 5 includes, in a lower portion thereof, a case 5B accommodating a crankshaft, a transmission, and the like. The cylinder portion 5A is connected to the front portion of the case 5B. The cylinder portion 5A extends upward from the case 5B. The cylinder portion 5A may be inclined forward as shown in FIG. 1 or may be arranged vertically.

The ATV 100 includes a seat 4. The front portion of the engine 5 is located farther forward than the seat 4. In the example of the ATV 100, the cylinder portion 5A is located farther forward than the seat 4, and the rear portion of the case 5B is located under the foremost portion of the seat 4. The positional relationship between the engine 5 and the seat 4 is not limited to the example of the ATV 100. For example, the entire engine 5 may be positioned farther forward than the foremost portion of the seat 4. The vehicle frame 50 includes a lower frame 51 extending in the front-rear direction. The engine 5 is placed on the lower frame 51 to be supported by the lower frame 51. The vehicle frame 50 includes two lower frames 51 which are spaced apart from each other in the left-right direction. The structure of the vehicle frame 50 is not limited to the example of the ATV 100, and may be changed as appropriate.

The ATV 100 includes a fuel tank 1 that stores fuel to be supplied to the engine 5. As shown in FIG. 1, the fuel tank 1 is located above the engine 5. Specifically, the fuel tank 1 is located above the cylinder portion 5A and overlaps with the cylinder portion 5A in a plan view of the vehicle body. The entire fuel tank 1 may be located above the cylinder portion 5A. Alternatively, a portion of the fuel tank 1 may be below the upper end of the cylinder portion 5A.

The fuel tank 1 is located forwardly of the seat 4. In the example of the ATV 100, the rearmost portion of the fuel tank 1 is located under the front end 4c of the upper surface 4a of the seat 4. Alternatively, the entire fuel tank 1 may be positioned farther forward than the front end 4c of the upper surface 4a of the seat 4. The seat 4 includes, in its right and left portions, side surfaces 4b (see FIG. 2) extending downward from the upper surface 4a. The rear portion of the fuel tank 1 is located between the front ends 4e of the right and left side surfaces 4b. Alternatively, the rear portion of the fuel tank 1 may be located farther forward of the front ends 4e of the side surfaces 4b.

As shown in FIG. 1, the fuel tank 1 is covered with a cover 8 defining a portion of the exterior of the vehicle body. The fuel tank 1 includes a tank main body 10 and a fuel filler Fs which will be described below. The cover 8 covers the upper side, the right side, and the left side of the tank main body 10. A steering column (not shown) extending downward from the steering bar 71 is located in front of the fuel tank 1.

Figure 3:
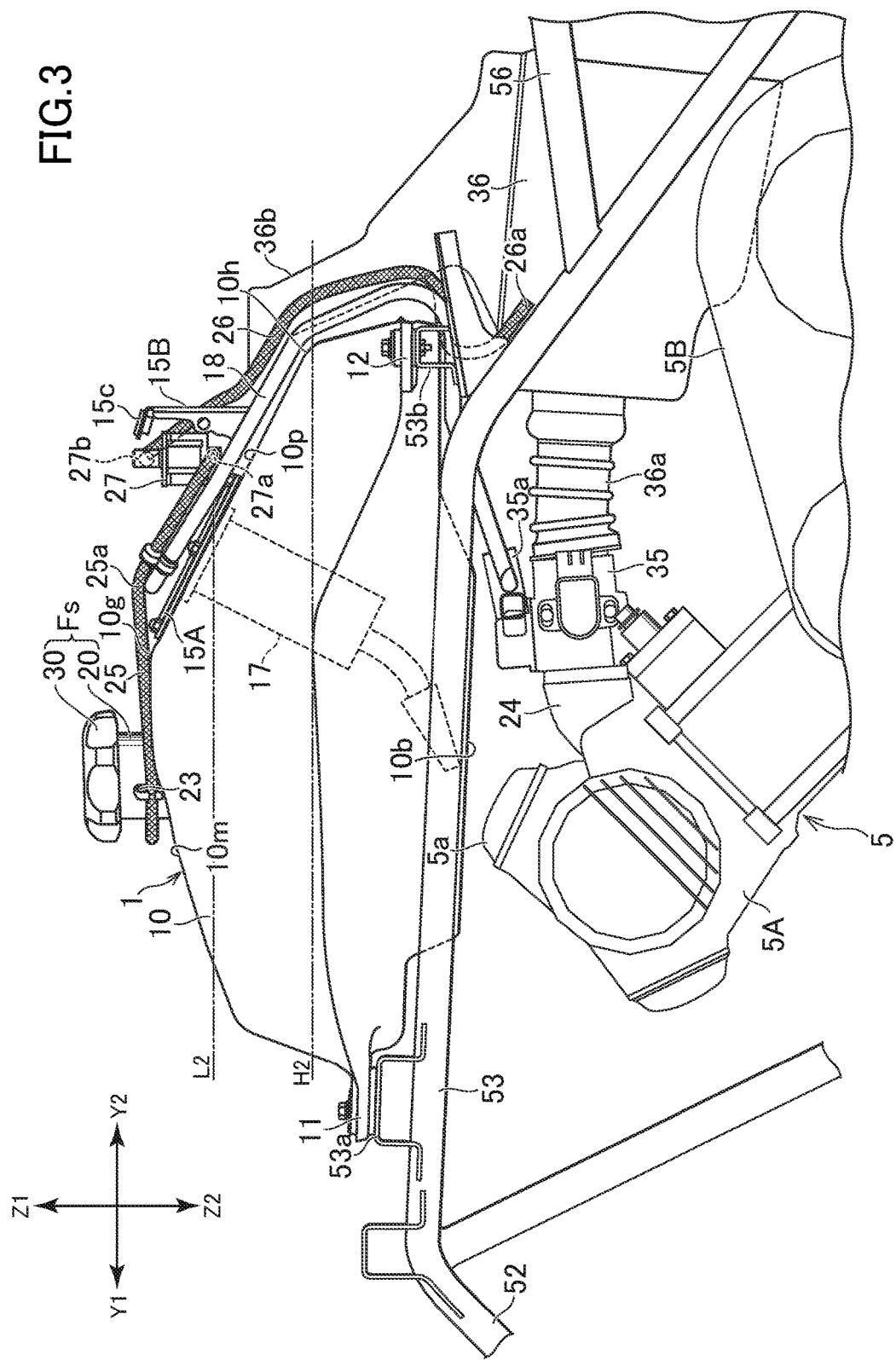
FIG. 3 is a side view showing a main portion of the all-terrain vehicle shown in FIG. 1.

As shown in FIG. 3, an intake system that supplies fuel and air to the cylinder portion 5A is disposed behind the cylinder portion 5A. The intake system includes a throttle body 35 and an air cleaner 36. The throttle body 35 includes a throttle valve therein to adjust the air amount. The throttle body 35 is connected to a duct 24 extending rearward from the cylinder portion 5A (more specifically, a cylinder head). Further, a duct 36a extending forward from the air cleaner 36 is connected to the throttle body 35.

The fuel tank 1 is located above the intake system. In the example of the ATV 100, the fuel tank 1 is located above the cylinder portion 5A, the throttle body 35, and the duct 36a. The fuel tank 1 is positioned above the air cleaner 36. The air cleaner 36 is located farther rearward than the fuel tank 1.

The air cleaner 36 includes an intake duct 36b extending upward from the upper portion of the air cleaner 36. The intake duct 36b is located behind the fuel tank 1. The end of the intake duct 36b opens upward. Further, the end of the intake duct 36b is covered by the seat 4. The positional relationship between the air cleaner 36 and the fuel tank 1 is not limited to the example of the ATV 100. For example, the air cleaner 36 may be located under the fuel tank 1, like the throttle body 35. The outflow prevention valve 27 described below is preferably located above the end (opening) of the intake duct 36b.

As shown in FIG. 1, the vehicle frame 50 includes a front frame 52 extending upward from the foremost portion of the lower frame 51 and a tank support frame 53 extending rearward from the upper portion of the front frame 52. Specifically, the vehicle frame 50 includes two front frames 52 that are separated from each other in the right-left direction and two tank support frames 53 that are separated from each other in the left-right direction. The tank support frames 53 are located above the cylinder portion 5A of the engine 5. The fuel tank 1 is mounted on the tank support frame 53.

Figure 4:
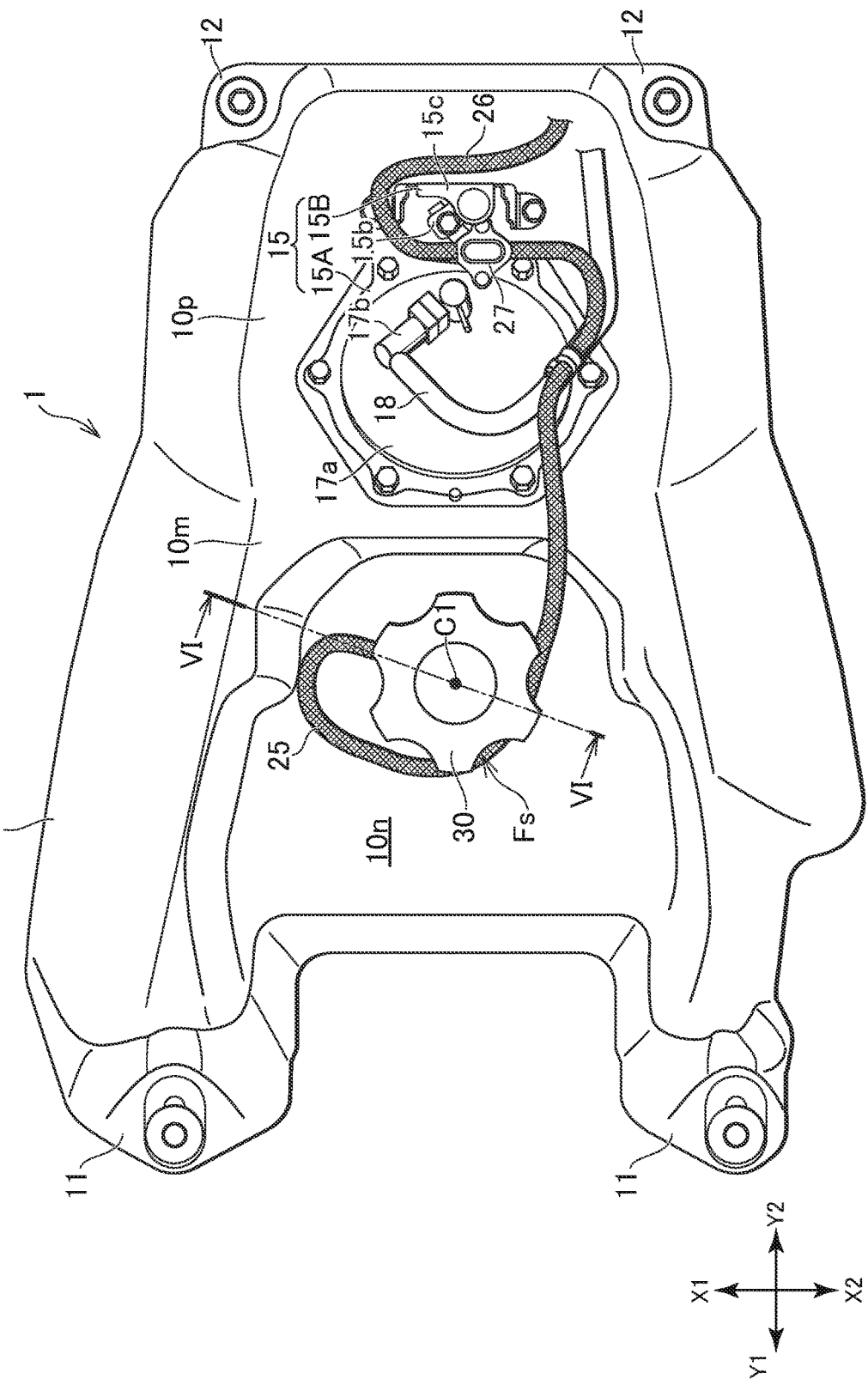
FIG. 4 is a plan view showing a fuel tank mounted on the all-terrain vehicle shown in FIG. 1.

As shown in FIG. 3, the fuel tank 1 includes a tank main body 10 including a fuel storage that stores fuel. The tank main body 10 includes attachments 11, 12 mounted on the tank support frames 53. As shown in FIG. 4, the tank main body 10 includes, at the front end thereof, two attachments 11 which are spaced apart from each other in the right-left direction. Further, the tank main body 10 includes, at the rear end thereof, two attachments 12 which are spaced apart from each other in the right-left direction. The attachments 11, 12 are attached to bridges 53a, 53b (see FIG. 3) connecting the right and left tank support frames 53, respectively. The mounting structure of the fuel tank 1 by the vehicle frame 50 is not limited to the example of the ATV 100. For example, the attachments 11, 12 may be directly attached to the tank support frame 53.

Figure 5:
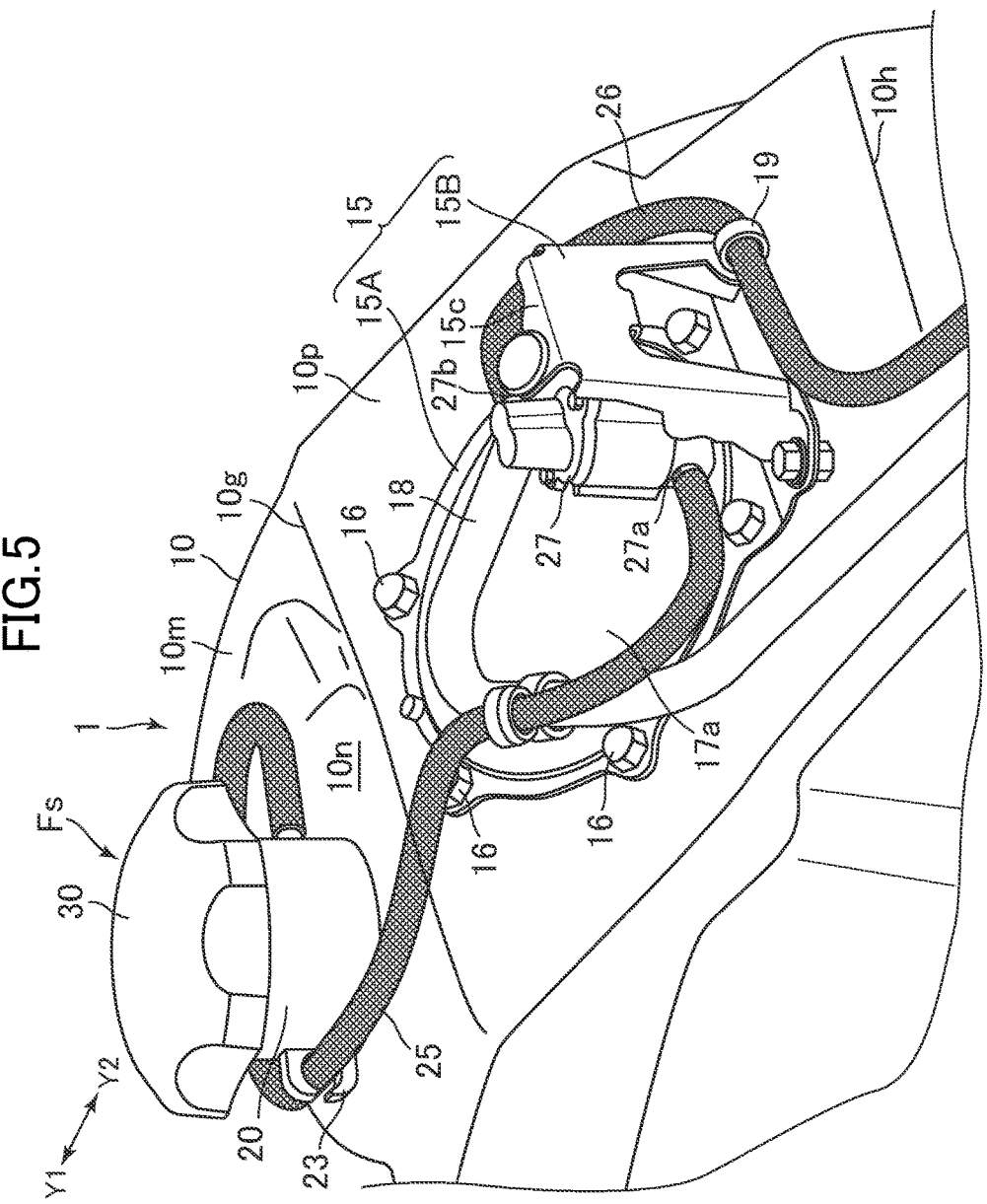
FIG. 5 is a perspective view of the fuel tank shown in FIG. 4.
Figure 6:
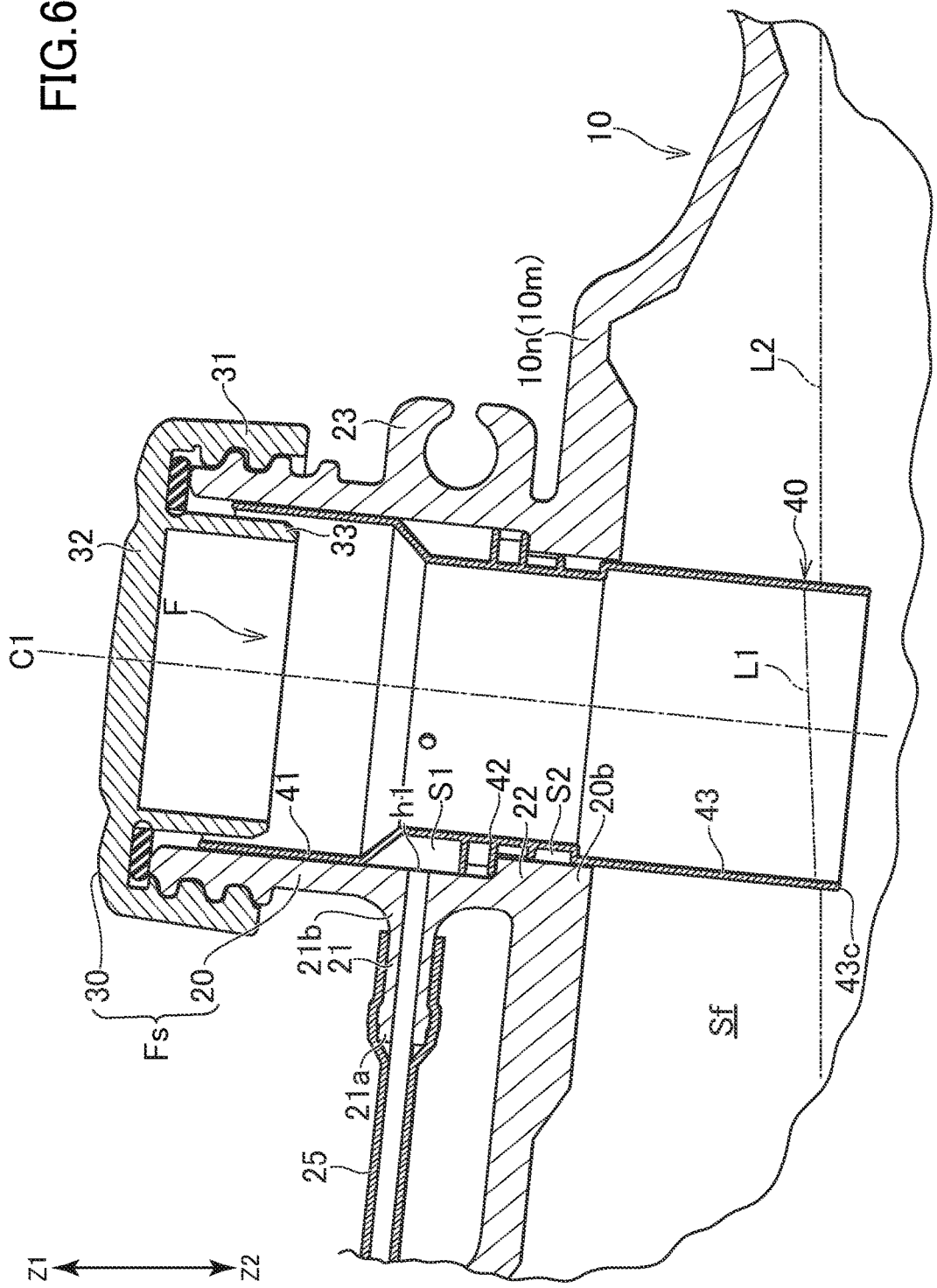
FIG. 6 is a cross-sectional view taken along the line VI-VI shown in FIG. 4.

The fuel tank 1 includes a fuel filler Fs connected to the tank main body 10. As shown in FIG. 6, the fuel filler Fs includes a fuel filler neck 20 including a filler opening F. The fuel filler neck 20 is preferably cylindrical or tubular shaped, for example. Also, the fuel filler Fs includes a filler cap 30 attached to the fuel filler neck 20 to close the filler opening F. As shown in FIG. 5, in the example of the ATV 100, the fuel filler neck 20 protrudes upward from the upper surface 10m of the tank main body 10. The filler opening F opens upward. The fuel filler neck 20 may extend vertically from the upper surface 10m of the tank main body 10. Alternatively, the fuel filler neck 20 may be inclined with respect to the upper surface 10m of the tank main body 10. In the example of the ATV 100, the tank main body 10 and the fuel filler neck 20 are preferably made of resin, for example. The tank main body 10 and the fuel filler neck 20 may be made of metal.

As shown in FIG. 3, breather channels 25 and 26 are connected to the fuel filler Fs. The breather channels 25 and 26 prevent the pressure inside the tank main body 10 from excessively rising. When the pressure inside the tank main body 10 rises, vapor containing vaporized fuel and air in the tank main body 10 is discharged from the tank main body 10 through the breather channels 25 and 26. Conversely, when the pressure in the tank main body 10 drops, air is introduced into the tank main body 10 through the breather channels 25 and 26. The ATV 100 includes a first breather tube 25 and a second breather tube 26 as breather channels. The breather tubes 25 and 26 are preferably made of, for example, a flexible material (for example, rubber). The breather tubes 25 and 26 may be made of plastic. An outflow prevention valve 27 that prevents liquid fuel from flowing outward is installed in the breather channel. Specifically, an outflow prevention valve 27 is installed between the first breather tube 25 and the second breather tube 26. The outflow prevention valve 27 will be described in detail below.

One end of the first breather tube 25 is connected to the fuel filler Fs. In the example of the ATV 100, the first breather tube 25 is connected to the fuel filler neck 20. As shown in FIG. 6, the fuel filler neck 20 includes a connector tube 21 defining a portion of the breather channel. The connector tube 21 opens inside the fuel filler neck 20 through a breather hole h1 at the inner surface of the fuel filler neck 20. The connector tube 21 extends from the fuel filler neck 20 in the radial direction in the plan view of the fuel filler neck 20. The first breather tube 25 is connected to the connector tube 21. Alternatively, the breather hole h1 may be located in the filler cap 30. In this case, the first breather tube 25 may be connected to the filler cap 30. The structure where the first breather tube 25 is connected to the fuel filler neck 20 instead of the filler cap 30 prevents the first breather tube 25 from protruding above the fuel tank 1. Further, this structure fixes the position of the first breather tube 25. In other words, this structure eliminates the necessity of moving the first breather tube 25 when the filler cap 30 is removed.

The outflow prevention valve 27 prevents the outflow of liquid fuel. When the attitude of the vehicle body changes significantly, the outflow prevention valve 27 prevents the liquid fuel which has flowed into the breather hole h1 from being discharged to the outside through the breather channel. The outflow prevention valve 27 is in the open state thereof when the vehicle body is in a normal attitude. The outflow prevention valve 27 is in the closed state when the vehicle body is inclined by a predetermined angle. An example of such an outflow prevention valve 27 is a so-called rollover valve that switches its open/closed state according to the attitude of the outflow prevention valve 27. The rollover valve includes a valve body (for example, a ball) therein which moves due to a change in the attitude of the valve to open and close the valve. The outflow prevention valve 27 is not limited to a rollover valve. For example, the outflow prevention valve 27 may be a check valve. The ATV 100 may include a sensor that detects an attitude change of the vehicle body and/or a sensor that detects whether or not liquid fuel exists in the breather channel. In this case, the open state and closed state of the outflow prevention valve 27 may be electronically controlled according to the output of the sensor. The liquid fuel that has flowed into the breather channel returns to the tank main body 10, for example, when the pressure in the tank main body 10 drops.

The first breather tube 25 is connected to one port 27a (see FIG. 5) of the outflow prevention valve 27. One end of the second breather tube 26 is connected to the other port 27b (see FIG. 5) of the outflow prevention valve 27. Hereinafter, the port 27a to which the first breather tube 25 is connected is referred to as "inlet port", and the port 27b to which the second breather tube 26 is connected is referred to as "outlet port". Vapor in the fuel tank 1 flows into the inlet port 27a of the outflow prevention valve 27 through the first breather tube 25 and is discharged from the outlet port 27b.

In the example of the ATV 100, the end of the breather channel, that is, the other end of the second breather tube 26, opens to the atmosphere. Alternatively, a canister may be connected to the other end of the second breather tube 26 to adsorb the vaporized fuel flowing through the breather channel.

As shown in FIG. 3, the outflow prevention valve 27 is located above the lower surface 10b of the tank main body 10 in a side view of the vehicle body. Further, the outflow prevention valve 27 is located above the upper end of the engine 5 in the side view of the vehicle body. In the example of the ATV 100, the outflow prevention valve 27 is located above the upper end 5a of the cylinder portion 5A. This arrangement of the outflow prevention valve 27 prevents liquid fuel from flowing into the outflow prevention valve 27, for example when the vehicle body is not tilted. Also, this arrangement of the outflow prevention valve 27 returns the liquid fuel in the first breather tube 25 to the tank main body 10, for example when the pressure in the tank main body 10 drops. As will be described in detail below, in the example of the ATV 100, the outflow prevention valve 27 is located above the upper surface 10m of the tank main body 10. As described above, the steering bar 71 is disposed in front of the fuel tank 1. The outflow prevention valve 27 is located below the steering bar 71. In the example of the ATV 100, the outflow prevention valve 27 is located below the center (lowest position) of the steering bar 71.

As shown in FIG. 5, in the example of the ATV 100, the outflow prevention valve 27 is located such that the outlet port 27b is positioned above the inlet port 27a. This arrangement limits liquid fuel from passing through the outflow prevention valve 27. In the example of the ATV 100, the outlet port 27b is located above the inlet port 27a in the side view of the vehicle body.

At least the outlet port 27b among the inlet port 27a and the outlet port 27b is positioned above the highest fuel level L2 (see FIG. 3) of the liquid fuel. This arrangement effectively limits liquid fuel from passing through the outflow prevention valve 27. The highest fuel level L2 is the level of the liquid surface when the liquid fuel is filled up to a predetermined maximum amount in the tank main body 10. In the example of the ATV 100, the maximum amount of liquid fuel is defined by the lower end 43c of the inner cylindrical member 40 (see FIG. 6) disposed inside the fuel filler neck 20. Therefore, in the example of the ATV 100, the outlet port 27b is positioned above the lower end 43c of the inner cylindrical member 40. In the example of the ATV 100, both of the outlet port 27b and the inlet port 27a are positioned above the fuel level L2. The position of the outflow prevention valve 27 is not limited to the example of the ATV 100. For example, while the outlet port 27b is positioned above the highest fuel level L2, the inlet port 27a may be positioned below the fuel level L2. In yet another example, the fuel tank 1 may not include the inner cylindrical member 40. In this case, the maximum amount of fuel may be defined, for example, by the lower end 20b of the fuel filler neck 20 (see FIG. 6).

As described above, the breather hole h1 is provided at the inner surface of the fuel filler neck 20. In the example of the ATV 100, the outlet port 27b of the outflow prevention valve 27 is positioned above the breather hole h1. This arrangement of the outflow prevention valve 27 more effectively prevents the liquid fuel entering the breather hole h1 from being discharged through the outflow prevention valve 27.

As shown in FIG. 3, in the example of the ATV 100, the outlet port 27b is positioned above the height H2 of the center of the tank main body 10 in the up-and-down direction. More specifically, the outlet port 27b is positioned above the middle height H2 between the highest position in the upper surface 10m of the tank main body 10 and the lowest position in the lower surface 10b of the tank main body 10. That is, the outlet port 27b is positioned above the central height H2 between the upper end and the lower end of the tank main body 10. The inlet port 27a may also be positioned above the middle height H2 between the upper end and the lower end of the tank main body 10.

As shown in FIG. 1, the upper surface 4a of the seat 4 includes a front portion descending rearward from its front end 4c. The upper surface 4a of the seat 4 includes a rear portion gently rising rearward. In other words, the upper surface 4a of the seat 4 includes, in the middle thereof, a lowest portion 4d at which the upper surface 4a has the lowest height. The outlet port 27b of the outflow prevention valve 27 is positioned above the lowest portion 4d of the seat 4. The inlet port 27a may also be positioned above the lowest portion 4d of the seat 4.

As shown in FIG. 4, the outflow prevention valve 27 is located farther leftward than the right end of the fuel tank 1 and is located farther rightward than the left end of the fuel tank 1. In the example of the ATV 100, the outflow prevention valve 27 overlaps the fuel tank 1 in the plan view. In other words, the outflow prevention valve 27 is located between the right end and the left end of the fuel tank 1 and is located between the front end and the rear end of the fuel tank 1. This arrangement of the outflow prevention valve 27 effectively utilizes the space on the upper side of the fuel tank 1. The positional relationship between the outflow prevention valve 27 and the fuel tank 1 is not limited to the example of the ATV 100. For example, the outflow prevention valve 27 may not overlap the fuel tank 1 in the plan view. For example, the outflow prevention valve 27 may be located rearward of the rear end of the fuel tank 1. As yet another example, the outflow prevention valve 27 may be located frontward of the front end of the fuel tank 1.

As shown in FIG. 3, the outflow prevention valve 27 is located farther forward than the front end 4c of the upper surface 4a of the seat 4. Further, the outflow prevention valve 27 is positioned farther forward than the intake duct 36b of the air cleaner 36. The outflow prevention valve 27 is positioned under a cover 8 and is covered with the cover 8. A second bracket 15B to be described below functions as a protection member in a vicinity of the outflow prevention valve 27. The second bracket 15B prevents an unnecessary force from acting on the outflow prevention valve 27 from the cover 8. The positional relationship between the outflow prevention valve 27 and the seat 4 is not limited to the example of the ATV 100. For example, the outflow prevention valve 27 may be located under the upper surface 4a of the seat 4. That is, the outflow prevention valve 27 may be located farther rearward than the front end 4c of the upper surface 4a of the seat 4.

The outflow prevention valve 27 is attached to the fuel tank 1. This facilitates a manufacturing process of the ATV 100 in which the outflow prevention valve 27 is attached to the fuel tank 1 and then the fuel tank 1 is mounted on the vehicle body. In other words, a worker is able to integrally connect the fuel tank 1 and the outflow prevention valve 27 in a process before attaching the fuel tank 1 to the vehicle frame 50. As a result, the assembly of the ATV 100 is facilitated. "The outflow prevention valve 27 is attached to the fuel tank 1" includes a preferred embodiment in which the outflow prevention valve 27 is directly attached to the fuel tank 1 and a preferred embodiment in which another attachment member (bracket) is attached to the fuel tank 1, and the outflow prevention valve 27 is fixed to the attachment member by a fixture such as a bolt or a screw. "The outflow prevention valve 27 is attached to the fuel tank 1" does not include a preferred embodiment in which the outflow prevention valve 27 is fixedly attached to the vehicle frame 50 and connected to the fuel tank 1 via the vehicle frame 50.

In the example of the ATV 100, the outflow prevention valve 27 is attached to the upper surface 10m of the tank main body 10. In the example of the ATV 100, a bracket 15 (see FIG. 5) is attached to the tank main body 10. The outflow prevention valve 27 is attached to the tank main body 10 via the bracket 15. As will be described below, the bracket 15 is also used to attach the connector 17a of the fuel pump 17 to the tank main body 10. Alternatively, the outflow prevention valve 27 may be attached on the side surface or the rear surface of the tank main body 10.

As described above, the fuel tank 1 includes the fuel filler Fs. The fuel filler Fs is located in the front portion of the tank main body 10. The outflow prevention valve 27 is attached to the rear portion of the tank main body 10 and is located farther rearward than the fuel filler Fs.

As shown in FIG. 3, a fuel pump 17 is disposed inside the tank main body 10. The fuel pump 17 includes a plate shaped connector 17a (see FIG. 5) on the upper portion thereof. The connector 17a is attached to the upper surface 10m of the tank main body 10. The fuel pump 17 extends downward from the connector 17a. As shown in FIG. 4, the fuel pump 17 includes a fuel discharge portion 17b on the upper side of the connector 17a. A fuel supply tube 18 is connected to the fuel discharge portion 17b. The fuel supply tube 18 extends downward through the rear side of the fuel tank 1 and is connected to an injector 35a in the throttle body 35 disposed under the fuel tank 1.

As shown in FIG. 4, in the example of the ATV 100, the outflow prevention valve 27 is located on the opposite side of the fuel filler Fs across the connector 17a of the fuel pump 17. This arrangement increases the linear distance between the breather hole h1 in the fuel filler Fs and the outflow prevention valve 27 and facilitates providing a sufficient length of the first breather tube 25, compared to an arrangement in which the fuel filler Fs and the outflow prevention valve 27 are located in the same direction from the connector 17a. As a result, the arrangement prevents liquid fuel entering the breather hole h1 from immediately reaching the outflow prevention valve 27. In the example of the ATV 100, the fuel filler Fs is located in front of the connector 17a and the outflow prevention valve 27 is located behind the connector 17a. The positional relationship between the connector 17a, the fuel filler Fs, and the outflow prevention valve 27 is not limited to the example of the ATV 100. For example, the fuel filler Fs and the outflow prevention valve 27 may be positioned in the same direction from the connector 17a. As another example, the outflow prevention valve 27 may be located in front of the fuel filler Fs. Alternatively, the outflow prevention valve 27 may be located on the lateral side of the fuel filler Fs.

As shown in FIG. 5, the upper surface 10m of the tank main body 10 includes, in a front portion thereof, a portion 10n including the fuel filler Fs thereon (hereinafter, the portion 10n having the fuel filler Fs is referred to as a "high portion"). The fuel filler Fs protrudes upward from the high portion 10n. In the example of the ATV 100, the high portion 10n extends horizontally or substantially horizontally. In addition, the upper surface 10m of the tank main body 10 includes an inclined portion 10p that extends downward as it extends away from the high portion 10n. In the example of the ATV 100, the inclined portion 10p extends rearward and downward from the high portion 10n. The outflow prevention valve 27 is spaced rearward from the upper end (front end) 10g of the inclined portion 10p. That is, the outflow prevention valve 27 is farther away from the high portion 10n beyond the upper end (front end) 10g of the inclined portion 10p.

The positional relationship between the outflow prevention valve 27 and the inclined portion 10p enables utilization of the space on the upper side of the inclined portion 10p. In the example of the ATV 100, as shown in FIG. 3, the lower portion of the outflow prevention valve 27 is positioned below the upper end 10g of the inclined portion 10p. The entire outflow prevention valve 27 may be below the upper end 10g of the inclined portion 10p. Alternatively, only the lower portion of the outflow prevention valve 27 may be below the upper end 10g of the inclined portion 10p. Further, in the example of the ATV 100, the outflow prevention valve 27 is positioned farther forward than the rear end (lower end) 10h of the inclined portion 10p. This arrangement also enables utilization of the space on the upper side of the inclined portion 10p for locating the outflow prevention valve 27. Alternatively, the outflow prevention valve 27 may be located farther rearward than the rear end 10h.

As shown in FIG. 5, the connector 17a of the fuel pump 17 is attached to the inclined portion 10p. The inclined portion 10p includes an opening therein to insert the fuel pump 17 into the tank main body 10. The outer peripheral portion of the connector 17a is attached to the edge of the opening. Therefore, the fuel pump 17 is disposed obliquely to the vertical direction. The outflow prevention valve 27 is positioned behind the connector 17a and is attached to the inclined portion 10p.

The position of the inclined portion 10p is not limited to the example of the ATV 100. For example, the inclined portion 10p may be located forward of the fuel filler Fs and may extend diagonally forward and downward from the high portion 10n. In this case, the outflow prevention valve 27 may be located forward of the upper end of the inclined portion 10p. In this case, the connector 17a of the fuel pump 17 may be attached to the inclined portion 10p in front of the fuel filler Fs.

As shown in FIG. 5, the outflow prevention valve 27 is attached to the tank main body 10 through a member that fixes the connector 17a to the tank main body 10. The fuel tank 1 includes a bracket 15 as a member that fixes the connector 17a. In the example of the ATV 100, the bracket 15 includes a first bracket 15A and a second bracket 15B connected to the first bracket 15A. The first bracket 15A fixes the connector 17a to the tank main body 10. The outflow prevention valve 27 is attached to the second bracket 15B. The second bracket 15B may be integral with the first bracket 15A. Alternatively, the second bracket 15B may be fixed to the first bracket 15A by fasteners such as bolts. As described above, the outflow prevention valve 27 in the example of the ATV 100 is attached to the tank main body 10 using attachment structure of the fuel pump 17. Specifically, the outflow prevention valve 27 is attached to the tank main body 10 by using, for example, bolt and a first bracket 15 fixed in the tank main body 10 by insert molding, for example. This attachment structure contributes to a reduction in the number of parts and contributes to simplification of the manufacturing process.

As described above, an opening is provided in the upper surface 10*m* of the tank main body 10 for inserting the fuel pump 17 in the tank main body 10. The outer peripheral portion of the connector 17*a* is disposed on the upper side of the edge of the opening. As shown in FIG. 5, the first bracket 15A is preferably annular shaped. The first bracket 15A is fixed to the edge of the opening of the tank main body 10 while the outer periphery of the connector 17*a* is sandwiched between the edge of the opening of the tank main body 10 and the first bracket 15A. Thus, the connector 17*a* is fixed to the tank main body 10. In the example of the ATV 100, the tank main body 10 is preferably made of resin, for example. The tank main body 10 includes a plurality of bolts, for example, aligned along the edge of the opening of the tank main body 10. The bolts are fixed to the edge of the opening by, for example, insert molding. The first bracket 15A is fixed to those bolts with nuts 16.

In the example of the ATV 100, the second bracket 15B extends upward from the outer periphery of the first bracket 15A. More specifically, the second bracket 15B extends upward from the rearmost portion of the first bracket 15A. The outflow prevention valve 27 is attached to the second bracket 15B to be located rearward of the connector 17*a* of the fuel pump 17. Further, the outflow prevention valve 27 is located above the inclined portion 10*p*. The second bracket 15B includes an attachment 15*b* (see FIG. 4) at an intermediate position of the second bracket 15B in the up-and-down direction. The outflow prevention valve 27 is attached to the attachment 15*b* with fasteners such as bolts and screws.

As shown in FIG. 3, the second bracket 15B includes a portion positioned above the outflow prevention valve 27. When a member disposed over the outflow prevention valve 27 is pushed downward (for example, when the cover 8 is pushed downward), the member (cover 8) hits the higher portion of the second bracket 15B before the member (cover 8) hits the outflow prevention valve 27. In the example of the ATV 100, as shown in FIG. 3, the top portion 15*c* of the second bracket 15B is positioned above the outflow prevention valve 27 in a side view of the vehicle body. Therefore, the second bracket 15B protects the outflow prevention valve 27. In the example of the ATV 100, the top portion 15*c* of the second bracket 15B is positioned above the top portion of the outflow prevention valve 27. Alternatively, the top portion 15*c* may be positioned at the same height as the top portion of the outflow prevention valve 27.

As described above, the seat 4 is located behind the fuel tank 1 and the cover 8. As shown in FIG. 5, the second bracket 15B is located behind the outflow prevention valve 27. When a driver sitting on the seat 4 pushes the rear portion of the cover 8, the second bracket 15B prevents the force from acting on the outflow prevention valve 27.

The positional relationship between the first bracket 15A and the second bracket 15B and the positional relationship between the second bracket 15B and the outflow prevention valve 27 are not limited to the example of the ATV 100. For example, the second bracket 15B may be fixed to the lateral side of the first bracket 15A. Alternatively, the second bracket 15B may be fixed to the front portion of the first bracket 15A. As yet another example, the fuel tank 1 may include a dedicated attachment structure for the outflow prevention valve 27. For example, when the tank main body 10 is made of resin, a dedicated bolt for the outflow prevention valve 27 may be fixed to the tank main body 10 by insert molding, for example. Alternatively, when the tank main body 10 is made of metal, the second bracket 15B may be fixed to the outer surface of the tank main body 10 by welding, for example.

As shown in FIG. 6, the fuel filler neck 20 includes a connector tube 21 defining the breather channel together with the breather tubes 25 and 26. The connector tube 21 extends from the fuel filler neck 20 in the radial direction of the fuel filler neck 20. The first breather tube 25 is connected to the connector tube 21. As shown in FIG. 4, in a plan view of the fuel filler neck 20, the first breather tube 25 curves around the fuel filler Fs to surround the fuel filler Fs, and then extends toward the outflow prevention valve 27. The first breather tube 25 surrounds the fuel filler Fs over at least 180 degrees in the plan view. This arrangement of the first breather tube 25 contributes to ensuring the length of the first breather tube 25 and effectively prevents the liquid fuel from reaching the outflow prevention valve 27 when the vehicle is running. In the example of the ATV 100, the connector tube 21 extends obliquely rightward and rearward from the fuel filler neck 20. The first breather tube 25 surrounds the right side and the front side of the fuel filler neck 20 and then extends rearward through the left side of the fuel filler neck 20.

The first breather tube 25 may curve around the outflow prevention valve 27 in the plan view to surround the outflow prevention valve 27. Specifically, the first breather tube 25 may surround the outflow prevention valve 27 over 180 degrees or more in the plan view.

As shown in FIG. 5, a guide portion 23 that holds a middle of the first breather tube 25 may be provided on the outer peripheral surface of the fuel filler neck 20. According to this structure, the position of the first breather tube 25 is fixed without increasing the number of parts. In the example of the ATV 100, the guide portion 23 is located on the opposite side from the connector tube 21. In detail, the guide portion 23 is positioned on the opposite side of the connector tube 21 across the center line C1 of the fuel filler neck 20. This arrangement of the guide portion 23 prevents the portion of the first breather tube 25 surrounding the fuel filler neck 20 from moving.

As shown in FIG. 6, the distal end 21*a* of the connector tube 21 is positioned above the proximal portion 21*b* of the connector tube 21 in a state where the fuel tank 1 is mounted on the vehicle body. This arrangement of the connector tube 21 returns the liquid fuel in the connector tube 21 to the fuel tank 1 by gravity. In the example of the ATV 100, in a state where the fuel tank 1 is mounted on the vehicle body, the high portion 10*n* of the tank main body 10 where the fuel filler neck 20 is located is slightly inclined such that the front side thereof is positioned below the rear side thereof. The fuel filler neck 20 is preferably perpendicular or substantially perpendicular to the high portion 10*n*. The connector tube 21 is preferably perpendicular or substantially perpendicular to the outer surface of the fuel filler neck 20 and is arranged parallel or substantially parallel to the high portion 10*n*. The connector tube 21 extends rightward and rearward from the fuel filler neck 20 as described above. As a result, the distal end 21*a* of the connector tube 21 is positioned above the proximal portion 21*b* of the connector tube 21.

Alternatively, the fuel tank 1 may be mounted on the vehicle body such that the high portion 10*n* of the tank main body 10 is horizontal or substantially horizontal. In this case, the fuel filler neck 20 may extend obliquely to the high portion 10*n* so that the distal end 21*a* of the connector tube 21 is positioned above the proximal portion 21*b* of the connector tube 21. Alternatively, the connector tube 21 may extend obliquely in the fuel filler neck 20.

As shown in FIG. 3, the first breather tube 25 is bent in a side view of the vehicle body such that a middle portion of the first breather tube 25 is highest. In detail, the first breather tube 25 includes a bent portion 25a in the middle portion of the first breather tube 25. The bent portion 25a is positioned above both the breather hole h1 and the outlet port 27b. Therefore, the liquid fuel is prevented from flowing into the outflow prevention valve 27 beyond the bent portion 25a.

In the example of the ATV 100, the high portion 10n of the tank main body 10 is slightly inclined such that its front portion descends. The tank main body 10 includes the inclined portion 10p extending rearward and downward from the high portion 10n. The first breather tube 25 is arranged along the high portion 10n and the inclined portion 10p. The first breather tube 25 includes a bent portion 25a at a portion between the connector tube 21 and the outflow prevention valve 27. The bent portion 25a is positioned above a portion upstream of the bent portion 25a (a portion closer to the connector tube 21) and a portion downstream of the bent portion 25a (a portion closer to the outflow prevention valve 27).

When the vehicle is running, the liquid fuel in the tank main body 10 may reach the breather hole h1 due to shaking of the vehicle body. The fuel filler Fs includes vapor-liquid separation chambers S1 and S2 therein. The vapor-liquid separation chambers S1 and S2 reduce the liquid fuel that reaches the breather hole h1. As shown in FIG. 6, the vapor-liquid separation chambers S1 and S2 are spaces along the inner surface of the fuel filler neck 20 and connected to the breather hole h1. Also, the vapor-liquid separation chambers S1 and S2 are spaces partitioned from the tank main body 10. The vapor-liquid separation chambers S1 and S2 are partitioned from the tank main body 10 so that liquid fuel is prevented from directly entering the vapor-liquid separation chambers S1 and S2 and vapor (vaporized fuel and air) in the tank main body 10 is able to flow toward the breather hole h1. Since the vapor-liquid separation chambers S1 and S2 reduce the liquid fuel reaching the breather hole h1, the position of the outflow prevention valve 27 is easily selected. Hereinafter, the "vapor-liquid separation chamber" is simply referred to as "separation chamber".

In the example of the fuel tank 1, as shown in FIG. 6, a cylindrical or substantially cylindrical member 40 is disposed inside the fuel filler neck 20 (hereinafter, the member 40 is referred to as "inner cylindrical member"). The inner cylindrical member 40 may have a center line identical to the center line C1 of the fuel filler neck 20. When refueling fuel tank 1, a nozzle of a fuel hose extending from an external fuel supply facility is inserted inside the inner cylindrical member 40. The inner cylindrical member 40 may be provided separately from the fuel filler neck 20, for example.

Figure 7:
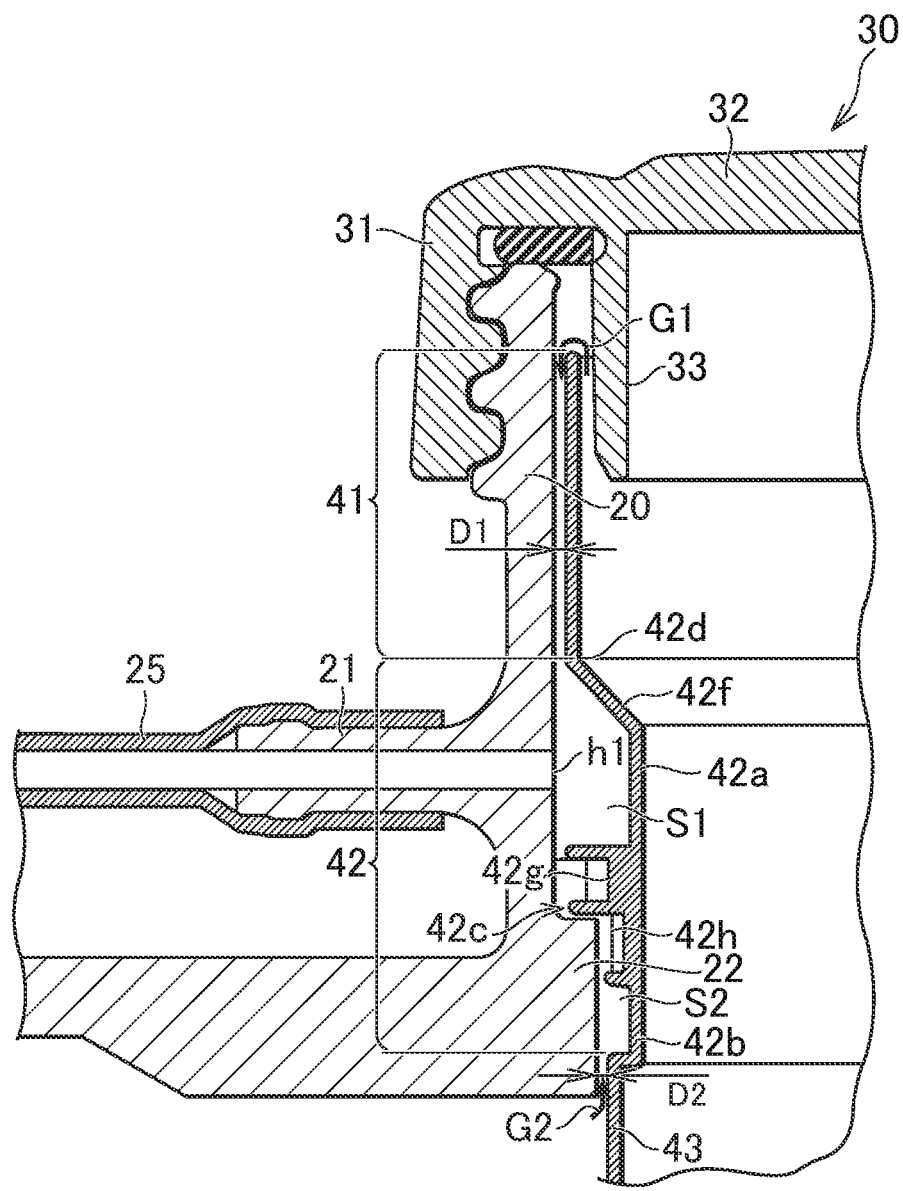
FIG. 7 is an enlarged view of FIG. 6.

The separation chambers S1 and S2 are located between the outer surface of the inner cylindrical member 40 and the inner surface of the fuel filler neck 20. As shown in FIG. 7, a gap is provided between the upper portion 41 of the inner cylindrical member 40 and the inner surface of the fuel filler neck 20. As shown by an arrow G1 in FIG. 7, vapor containing vaporized fuel and air is able to move between the breather channel and the tank main body 10 through the gap. A gap is also provided between the lower portion 43 of the inner cylindrical member 40 and the inner surface of the lower end of the fuel filler neck 20. As shown by an arrow G2 in FIG. 7, vapor containing vaporized fuel and air is able to move between the breather channel and the tank main body 10 through the gap. The separation chambers S1 and S2 are connected to the path of vapor flow. Therefore, when the liquid fuel enters the gap between the inner cylindrical member 40 and the fuel filler neck 20 due to shaking of the vehicle body, most of the liquid fuel temporarily remains in the separation chambers S1 and S2. The liquid fuel in the separation chambers S1 and S2 returns to the tank main body 10 through, for example, return grooves E1 and E2 (see FIGS. 14A and 14B) to be described below. In the example of the ATV 100, two separation chambers S1 and S2 are provided inside the fuel filler neck 20. The first separation chamber S1 is located at the breather hole h1. The structure of the inner cylindrical member 40 and the separation chambers S1 and S2 will be described in detail below.

The vapor-liquid separation chamber may not be located between the inner cylindrical member 40 and the inner surface of the fuel filler neck 20. For example, a vapor-liquid separation chamber may be located inside the filler cap 30 which closes the filler opening F. In this case, the breather hole h1 is provided in the filler cap 30, and the first breather tube 25 is connected to the filler cap 30.

As described above, the second breather tube 26 is connected to the outlet port 27b of the outflow prevention valve 27. As shown in FIG. 3, the second breather tube 26 extends downward through the rear side of the fuel tank 1. The end portion 26a of the second breather tube 26 is fixed to the tank support frame 53, for example, and opens to the atmosphere. As described above, the second bracket 15B is attached to the fuel tank 1. As shown in FIG. 5, the second bracket 15B includes a guide portion 19 that holds a middle of the second breather tube 26. In the example of the ATV 100, the guide portion 19 is located on the rear side of the second bracket 15B.

Figure 8:
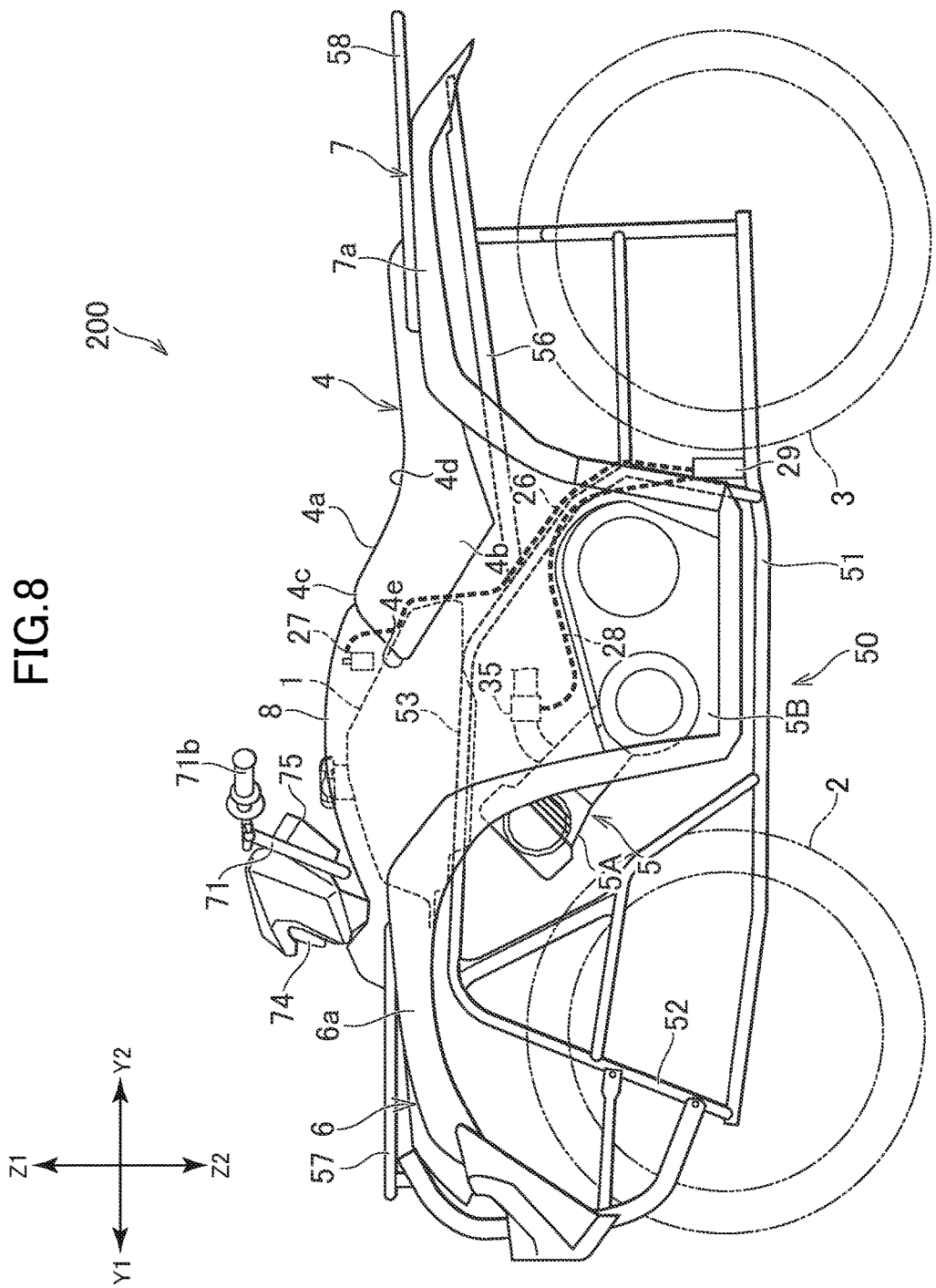
FIG. 8 is a diagram showing a modified example of an all-terrain vehicle according to a preferred embodiment of the present invention.

A canister may be connected to the second breather tube 26. FIG. 8 is a side view of an ATV 200 as a modification of the ATV 100. In this figure, the same parts, portions, and elements as those of the ATV 100 are denoted by the same reference numerals. Hereinafter, the difference from the ATV 100 will be mainly described. Items not described with respect to the ATV 200 are preferably the same or substantially the same as those of the ATV 100.

As shown in FIG. 8, the ATV 200 includes a canister 29. The canister 29 is located downstream of the outflow prevention valve 27. Specifically, the canister 29 is connected to the outlet port 27b of the outflow prevention valve 27 through the second breather tube 26. The inside of the canister 29 is filled with an adsorbent (for example, activated carbon). When the internal pressure of the fuel tank 1 rises, vapor containing vaporized fuel and air is discharged from the breather hole h1. The canister 29 temporarily adsorbs the vaporized fuel. The canister 29 includes a vent hole, and discharges only clean air to the atmosphere through the vent hole. The canister 29 is connected to the intake system through a purge tube 28. More specifically, the canister 29 is connected to the throttle body 35 through the purge tube 28. When the intake passage inside the throttle body 35 becomes a negative pressure due to operation of the engine 5, the fuel adsorbed by the canister 29 is introduced into the intake passage of the throttle body 35 and is then combusted in the engine 5.

The canister 29 is located below the outflow prevention valve 27. In the example of the ATV 200, the canister 29 is located below the upper end 5a of the engine 5. More specifically, the canister 29 is located below the throttle body 35. The purge tube 28 extends upward from the canister 29 toward the throttle body 35. In addition, the canister 29 is located behind the case 5B of the engine 5. The canister 29 is mounted on the lower frame 51, for example. The position of the canister 29 is not limited to the example of the ATV 200. For example, the canister 29 may be disposed in front of the engine 5. In this case, the canister 29 may be mounted on the lower frame 51. In still another example, the canister 29 may be located above the throttle body 35.

Preferred embodiments of the present invention are not limited to the examples of the ATV 100 and the ATV 200 described above. Various modifications are applicable to the ATV 100 and 200. FIGS. 9A and 9B to 14 are diagrams explaining exemplary modifications of the arrangement of the outflow prevention valve 27. Modified examples of the outflow prevention valve 27 will be described with reference to the respective figures. Hereinafter, the differences from the ATV 100 will be mainly described. Portions, structures, and features not described in each figure are preferably the same or substantially the same as those in the example of the ATV 100. The outflow prevention valve 27 in the ATV shown in these figures, like that in the ATV 100, is located above the lower surface 10b of the tank main body 10. Further, the outflow prevention valve 27 is above the upper end of the engine 5 (that is, the upper end 5a of the cylinder portion 5A). The outflow prevention valve 27 is preferably located such that at least the outlet port 27b thereof is located above the fuel level L2 (see FIG. 3) of the liquid fuel in the fuel tank 1.

Figure 9A:
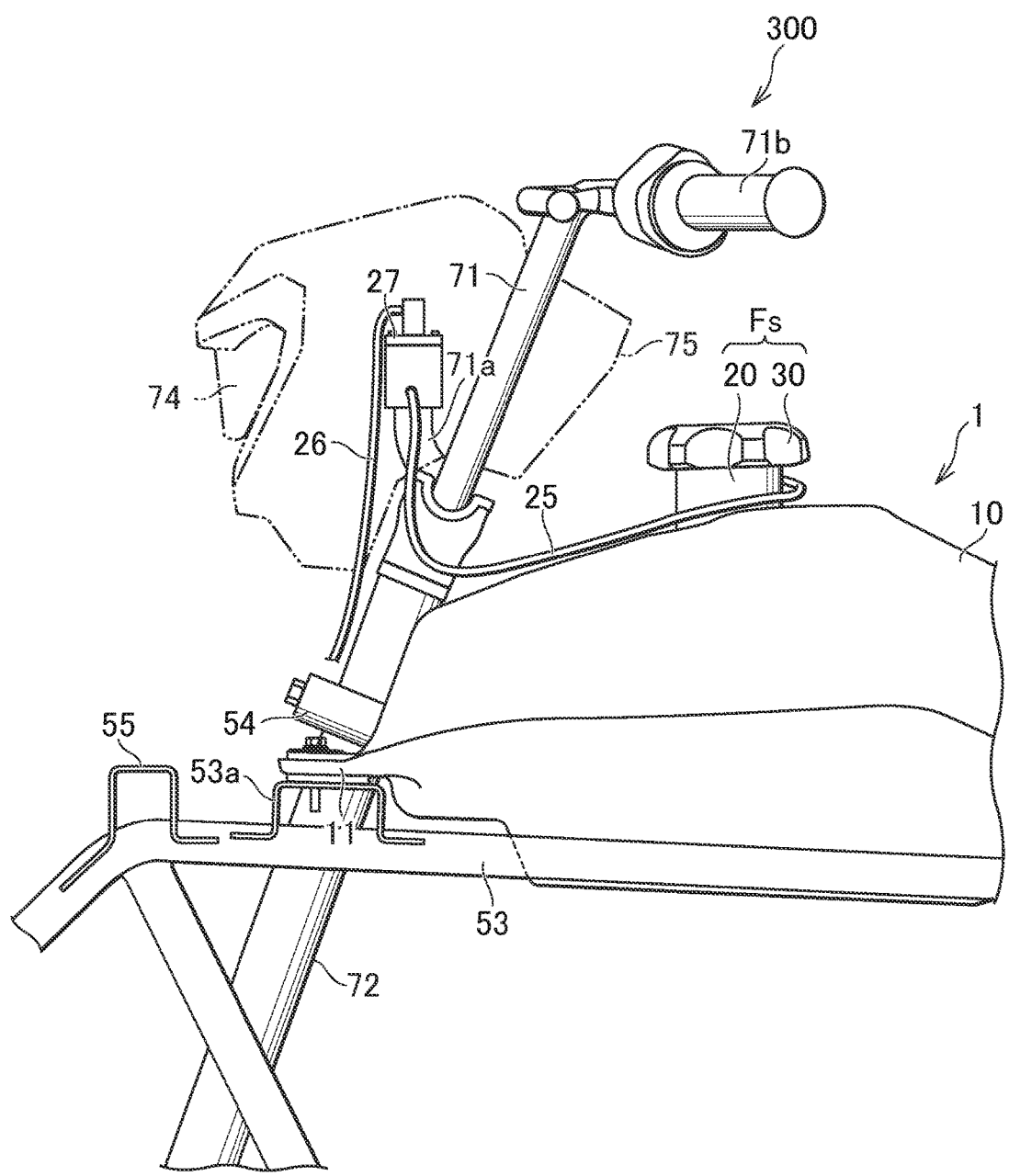
FIG. 9A is a diagram showing still another modification of an all-terrain vehicle according to a preferred embodiment of the present invention.
Figure 9B:
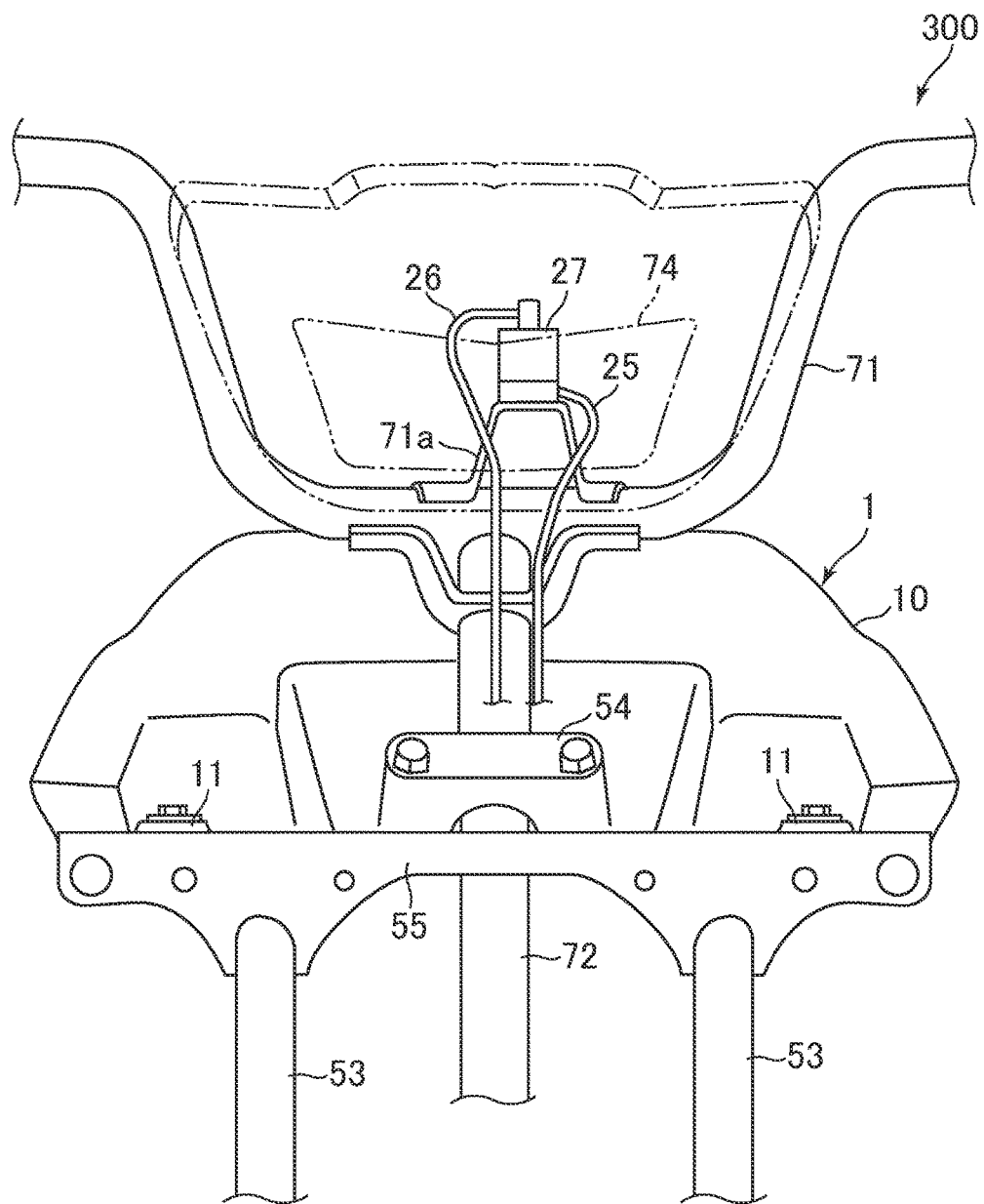
FIG. 9B is a front view of the all-terrain vehicle shown in FIG. 9A.

FIGS. 9A and 9B show the front portion of the ATV 300 with the cover removed. FIG. 9A is a side view and FIG. 9B is a front view. In the example of the ATV 300, the outflow prevention valve 27 is located farther forward than the fuel tank 1, unlike the example of the ATV 100. This arrangement contributes to securing a sufficient length of the channel (first breather tube 25) from the fuel filler Fs to the outflow prevention valve 27. In the ATV 300, the outflow prevention valve 27 is mounted on the steering system. The steering system includes a steering bar 71, a steering column 72, and a support 54 at the foremost portion of the vehicle frame 50 and rotatably supporting the steering column 72 (the support 54 is disposed between the right and left tank support frames 53). The steering column 72 extends downward from the center of the steering bar 71 and is connected to the front wheel 2 through a tie rod or knuckle (not shown). In the example of the ATV 300, the outflow prevention valve 27 is mounted on a portion that turns integrally with the steering bar 71. In detail, the outflow prevention valve 27 is attached to the steering bar 71 through a bracket 71a in the steering bar 71. A headlight 74 (see FIG. 1) and a meter device 75 (see FIG. 1) are attached to the steering system. The outflow prevention valve 27 may be disposed inside a case that houses the headlight 74 and the like. The bracket 71a may support the headlight 74 and/or the meter device 75. That is, a bracket supporting the headlight 74 and the like may be used to support the outflow prevention valve 27. In the example of the ATV 300, the first breather tube 25 extends forward from the fuel filler Fs and is connected to the outflow prevention valve 27. The second breather tube 26 extends downward along the steering column 72 from the outflow prevention valve 27.

Figure 10:
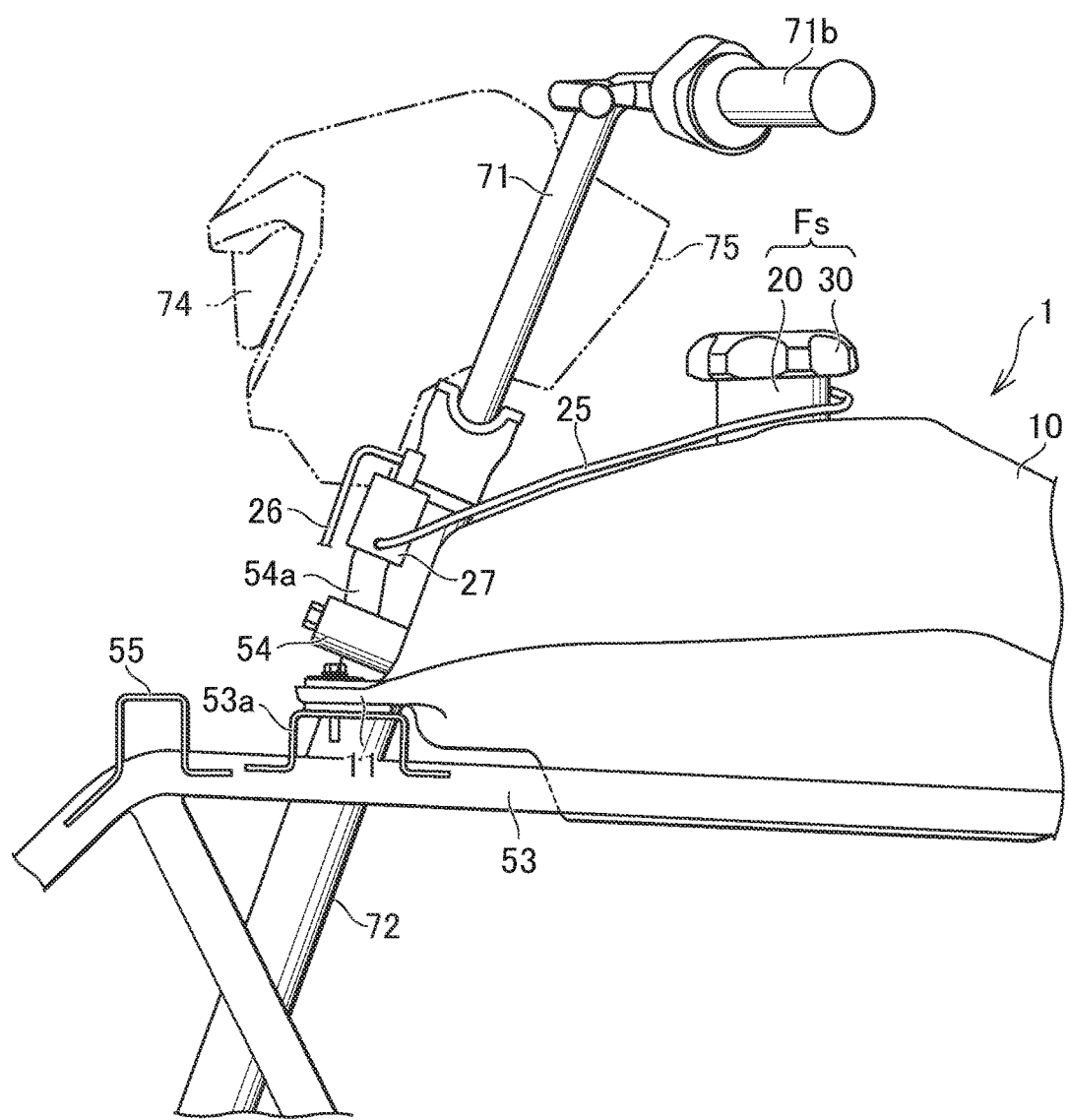
FIG. 10 is a diagram for a further modified example of an all-terrain vehicle according to a preferred embodiment of the present invention.

In the example of the ATV 300, the outflow prevention valve 27 may not be mounted on the steering bar 71. For example, as shown in FIG. 10, the outflow prevention valve 27 may be mounted on a support 54 (see FIG. 9B) that rotatably supports the steering column 72. In the example of FIG. 10, the outflow prevention valve 27 is attached to the support 54 through the bracket 54a of the support 54. Even when the steering bar 71 rotates, since the support 54 does not turn, this structure keeps the outflow prevention valve 27 and the first breather tube 25 in a stable position. In the example of FIG. 10, the outflow prevention valve 27 may be disposed inside the front cover 6 (see FIG. 1) which defines the exterior of the front portion of the vehicle body.

Figure 11:
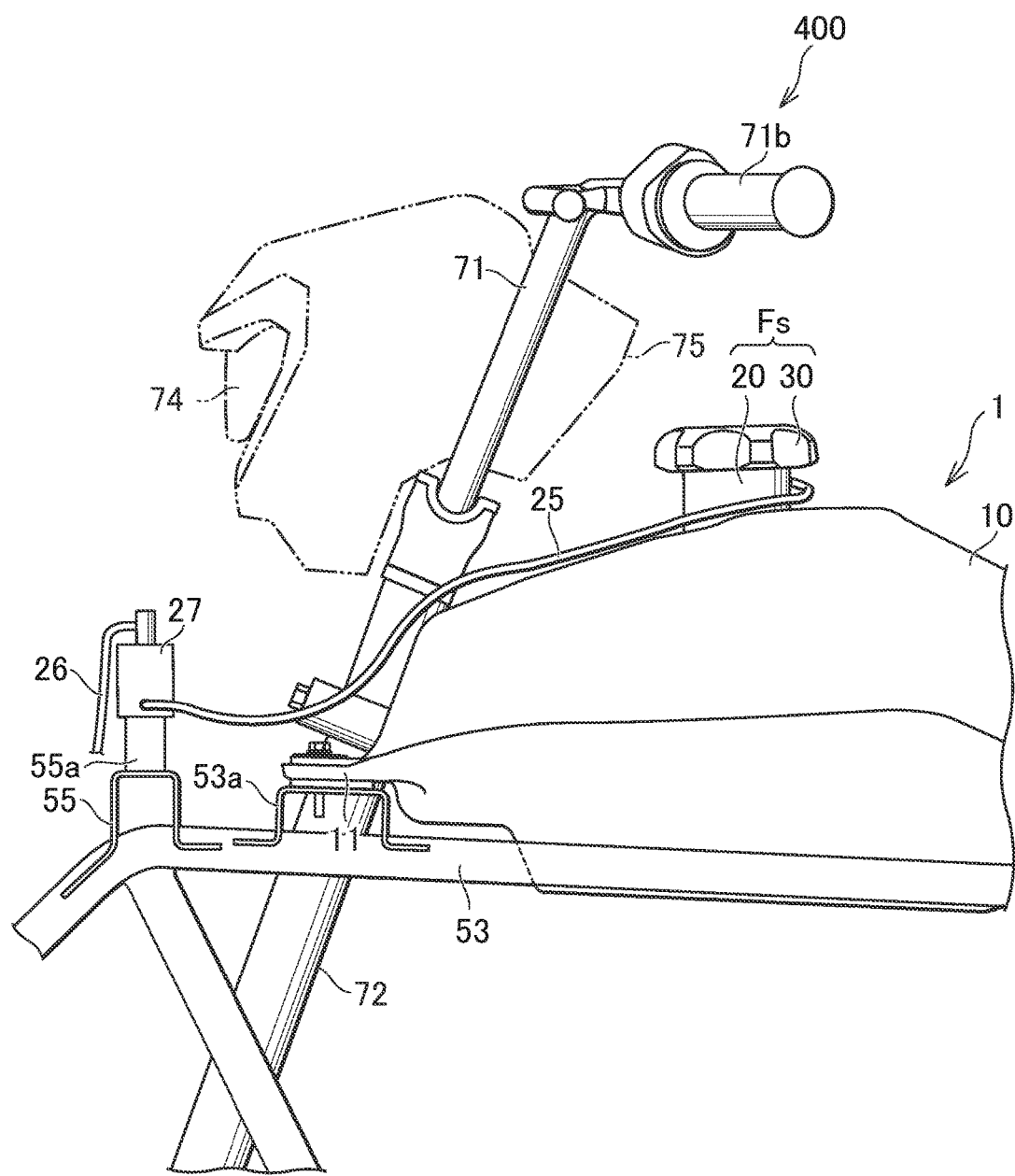
FIG. 11 is a diagram for a further modified example of an all-terrain vehicle according to a preferred embodiment of the present invention.

FIG. 11 shows a front portion of the ATV 400 with the cover removed. In the example of the ATV 400, like in the ATV 300, the outflow prevention valve 27 is positioned farther forward than the fuel tank 1. The vehicle frame 50 includes a portion located farther forward of the fuel tank 1 and the outflow prevention valve 27 may be mounted on the portion of the vehicle frame 50. In the example of the ATV 400, the vehicle frame 50 includes a bridge 55 connecting the upper ends of the right and left front frames 52 (in other words, the front ends of the right and left tank support frames 53) and located in front of the fuel tank 1. The outflow prevention valve 27 is mounted on the bridge 55, for example, through a bracket 55a of the bridge 55. This arrangement contributes to securing a sufficient length of the channel (first breather tube 25) from the fuel filler Fs to the outflow prevention valve 27.

Figure 12:
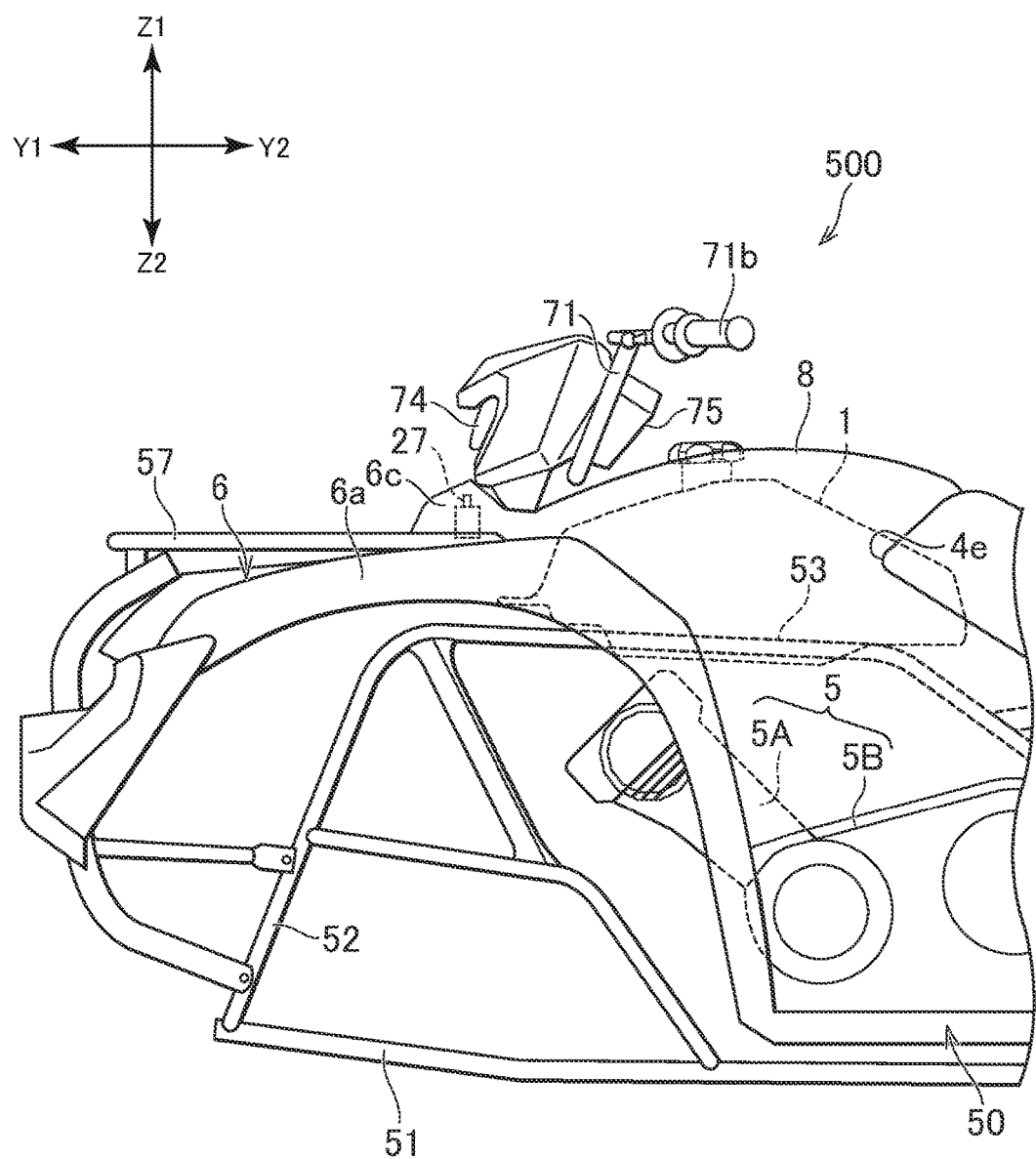
FIG. 12 is a diagram for a further modified example of an all-terrain vehicle according to a preferred embodiment of the present invention.

FIG. 12 shows a side view of the front portion of the ATV 500. In the example of the ATV 500, like in the ATV 400, the outflow prevention valve 27 is located forwardly of the fuel tank 1. Unlike the example of the ATV 400, the outflow prevention valve 27 is attached to the inside (lower surface) of the front cover 6. The front cover 6 includes a portion 6c that upwardly bulges. The outflow prevention valve 27 is disposed, for example, inside the bulging portion 6c and attached to the front cover 6 via a bracket (not shown).

Figure 13:
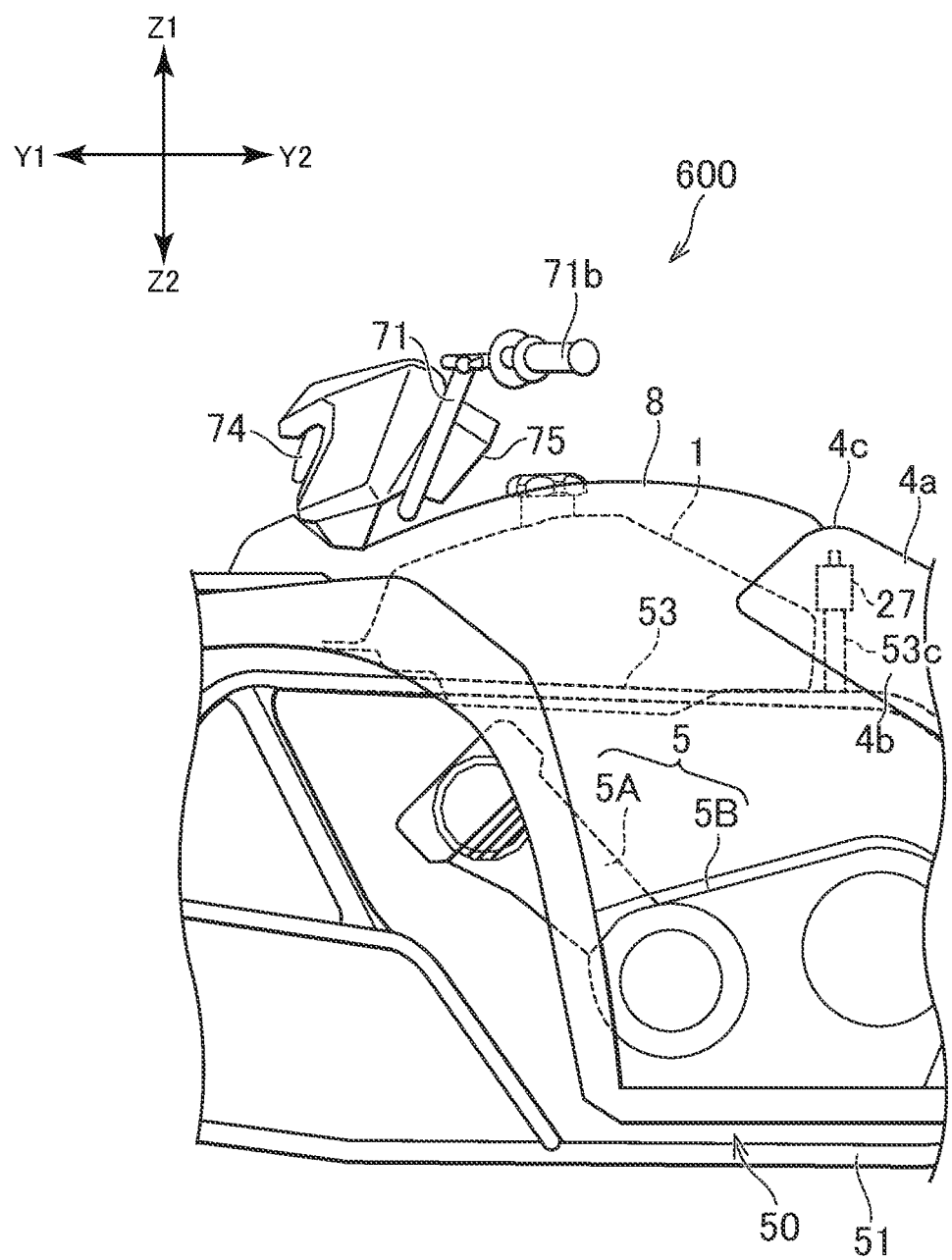
FIG. 13 is a diagram for a further modified example of an all-terrain vehicle according to a preferred embodiment of the present invention.

FIG. 13 shows a side view of the ATV 600. In the example of the ATV 600, the outflow prevention valve 27 is located behind the fuel tank 1. The outflow prevention valve 27 is attached to the tank support frame 53. In this case, as shown in FIG. 13, a bracket 53c extending upward may be attached to the tank support frame 53. The outflow prevention valve 27 may be attached to the bracket 53c. This structure increases the possible locations of the outflow prevention valve 27.

The vehicle frame 50 includes a portion positioned farther rearward than the fuel tank 1. In the example of FIG. 13, the outflow prevention valve 27 may be attached to that portion of the vehicle frame 50. For example, the vehicle frame 50 includes a seat frame 56 (see FIG. 1) positioned below the seat 4 to support the seat 4. The outflow prevention valve 27 may be attached to the seat frame 56 via a bracket.

As shown in FIGS. 1 and 2, the ATV 100 may include a front carrier 57 that fixes items to the front portion of the vehicle body. The front carrier 57 is disposed above the front cover 6 and positioned forward of the fuel tank 1. The outflow prevention valve 27 may be attached to the front carrier 57.

As shown in FIGS. 1 and 2, the ATV 100 may include a rear carrier 58 that fixes items to the rear portion of the vehicle body. The rear carrier 58 is disposed above the rear cover 7 and positioned forward of the fuel tank 1. The outflow prevention valve 27 may be attached to the rear carrier 58.

Figure 14A:
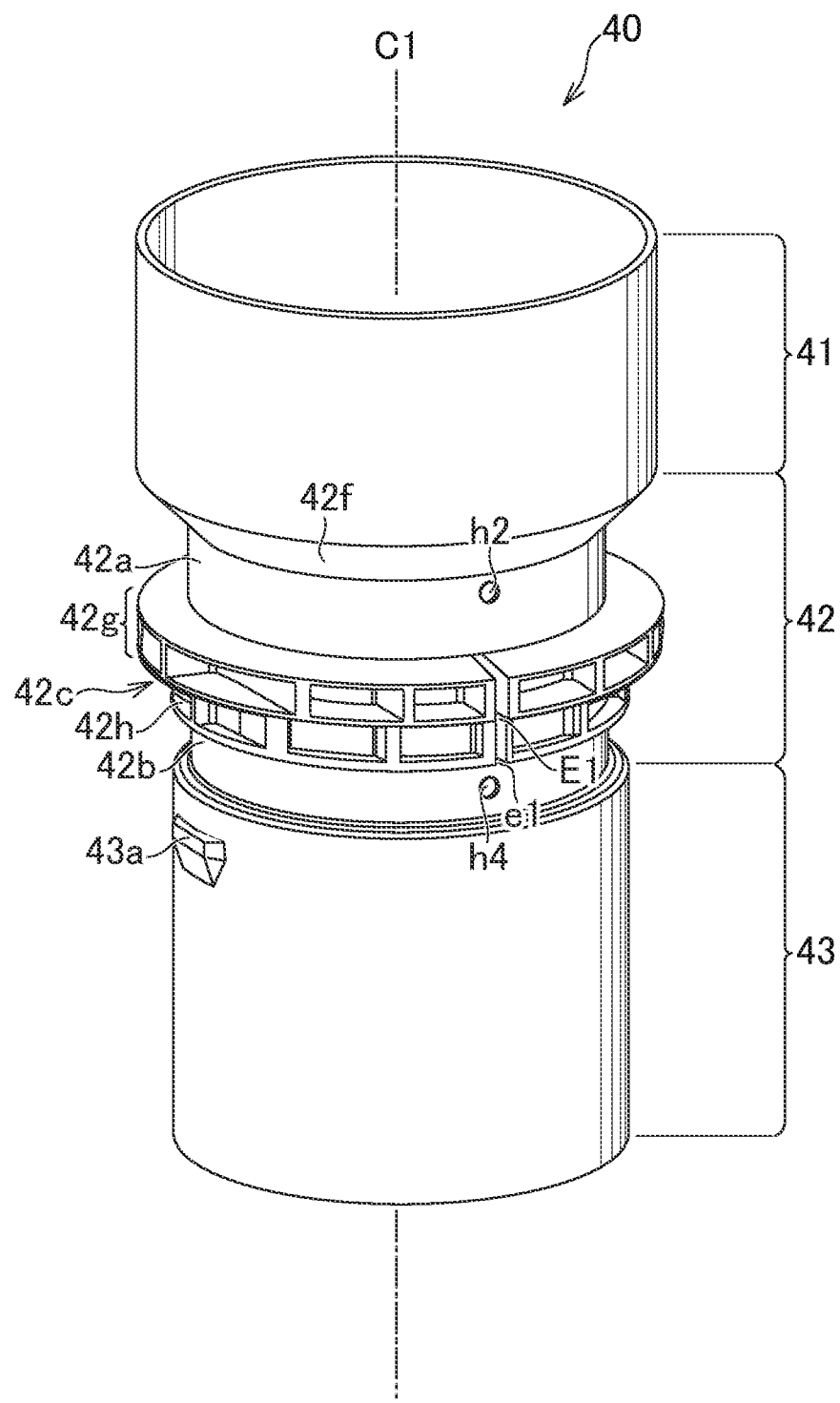
FIGS. 14A and 14B are perspective views of an inner cylindrical member disposed inside a fuel filler.
Figure 14B:
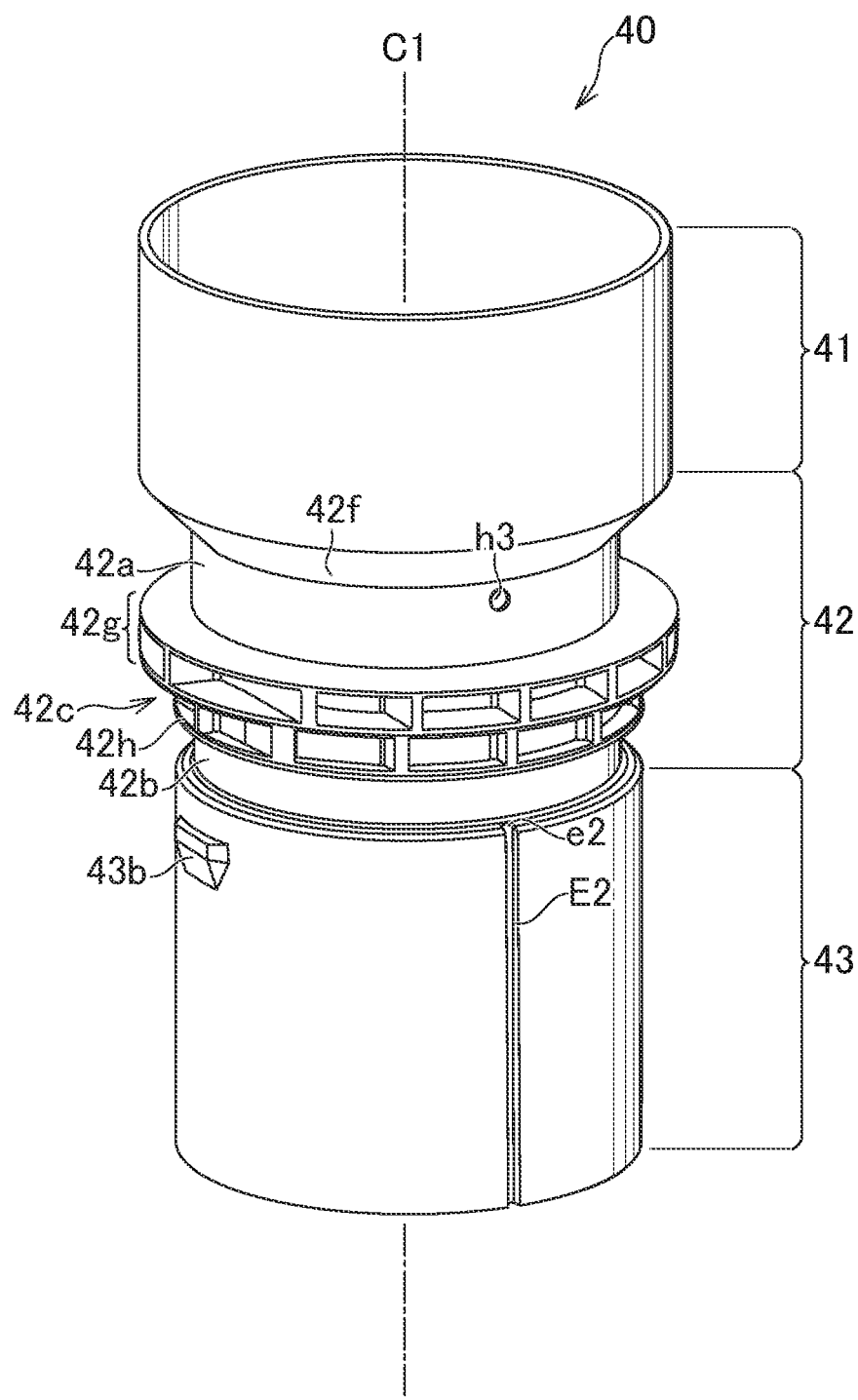

In the following, the above-described vapor-liquid separation chambers S1 and S2 and the inner cylindrical member 40 disposed inside the fuel filler neck 20 will be described in detail. FIGS. 14A and 14B are perspective views of the inner cylindrical member 40. FIG. 14B shows the side opposite to the side shown in FIG. 14A.

In the example of the fuel tank 1, as shown in FIG. 14A, the inner cylindrical member 40 includes an upper cylindrical portion 41 that is a portion of the inner cylindrical member 40 extending in the longitudinal direction of the inner cylindrical member 40 (the longitudinal direction is a direction extending along the center line C1 of the fuel filler neck 20). In addition, the inner cylindrical member 40 includes a lower cylindrical portion 43 that is another portion of the inner cylindrical member 40 extending in the longitudinal direction of the inner cylindrical member 40. In addition, the inner cylindrical member 40 includes a middle cylindrical portion 42 located between the upper and lower cylindrical portions 41 and 43, wherein the middle cylindrical portion 42 is still another portion of the inner cylindrical member 40 that extends in the longitudinal direction of the inner cylindrical member 40. The middle cylindrical portion 42 and the inner surface of the fuel filler neck 20 are separated from each other in the radial direction of the filler opening F. The separation chambers S1 and S2 are located between the middle cylindrical portion 42 and the inner surface of the fuel filler neck 20. The upper cylindrical portion 41, which is the upper portion of the inner cylindrical member 40, is located above the separation chambers S1 and S2. The lower cylindrical portion 43, which is the lower portion of the inner cylindrical member 40, is located below the separation chambers S1 and S2.

As shown in FIG. 6, in the example of the fuel tank 1, two separation chambers S1 and S2 are provided inside the fuel filler neck 20. The two separation chambers S1 and S2 are separated from each other in the direction along the center line C1 of the fuel filler neck 20. In the example of the fuel tank 1, the two separation chambers S1 and S2 are separated from each other in the vertical direction. This structure reduces the amount of liquid fuel entering the breather hole h1 more effectively. In the example of the fuel tank 1, the second separation chamber S2 is located below the first separation chamber S1. Therefore, the second separation chamber S2 reduces the amount of liquid fuel entering the first separation chamber S1 from the lower side of the first separation chamber S1. The middle cylindrical portion 42 includes a partition 42c protruding in the radial direction of the filler opening F from the middle cylindrical portion 42. The partition 42c partitions the two separation chambers S1 and S2 from each other. The partition 42c is preferably annular shaped and surrounds the center line C1 (see FIG. 14A). In the example of the fuel tank 1, the partition 42c extends over the entire circumference of the middle cylindrical portion 42.

In the example of the fuel tank 1, the first separation chamber S1 is located between the upper portion 42a of the middle cylindrical portion 42 and the inner surface of the fuel filler neck 20 (hereinafter, the upper portion 42a of the middle cylindrical portion 42 is referred to as a first middle cylindrical portion). A second separation chamber S2 is located between the lower portion 42b of the middle cylindrical portion 42 and the inner surface of the fuel filler neck 20 (the lower portion 42b of the middle cylindrical portion 42 is hereinafter referred to as a second middle cylindrical portion). The number of separation chambers is not limited to two. The number of separation chambers may be one or three or more, for example.

In the example of the fuel tank 1, the first separation chamber S1 has a larger volume than the second separation chamber S2. In detail, the distance between the first middle cylindrical portion 42a and the inner surface of the fuel filler neck 20 is greater than the distance between the second middle cylindrical portion 42b and the lower edge of the inner surface of the fuel filler neck 20. Alternatively, the distance between the first middle cylindrical portion 42a and the inner surface of the fuel filler neck 20 may be the same as the distance between the second middle cylindrical portion 42b and the lower edge of the inner surface of the fuel filler neck 20.

Inside the fuel filler neck 20, a channel is provided that allows vapor containing vaporized fuel and air to move between the breather hole h1 and the space inside the tank main body 10. In the example of the fuel tank 1, a gap in the vapor channel is located between the outer surface of the inner cylindrical member 40 and the inner surface of the fuel filler neck 20. In detail, as shown in FIG. 7, a slight gap is provided between the outer peripheral surface of the upper cylindrical portion 41 and the inner surface of the fuel filler neck 20. As indicated by arrow G1 in FIG. 7, vapor is allowed to pass through the gap. Also, a slight gap is provided between the outer peripheral surface of the lower cylindrical portion 43 and the lower edge of the inner surface of the fuel filler neck 20. As indicated by the arrow G2 in FIG. 7, vapor is allowed to pass through the gap.

As described above, a partition 42c is provided on the middle cylindrical portion 42. The outer diameter of the partition 42c is slightly smaller than the inner diameter of the fuel filler neck 20. In addition, the partition 42c is disposed on a projection 22 of the inner surface of the fuel filler neck 20, but is not fixed to the projection 22. Therefore, the vapor that has passed through the second separation chamber S2 may flow to the breather hole h1 through between the partition 42c and the inner surface of the fuel filler neck 20.

The separation chambers S1 and S2 are connected to the vapor channel extending from the main tank body 10 to the breather hole h1. In the example of the fuel tank 1, the first separation chamber S1 is located at breather hole h1. Therefore, vapor moving between the breather hole h1 and the tank main body 10 necessarily passes through the first separation chamber S1. On the other hand, the second separation chamber S2 is located below the first separation chamber S1. Therefore, vapor (for example, vapor indicated by the arrow G2 in FIG. 7) moving between the lower cylindrical portion 43 and the inner surface of the fuel filler neck 20 passes through the second separation chamber S2.

When liquid fuel enters the gap between the inner cylindrical member 40 and the fuel filler neck 20 due to shaking of the fuel tank 1, most of the liquid fuel is trapped in the separation chambers S1 and S2. Accordingly, the separation chambers S1 and S2 reduce the amount of liquid fuel entering breather hole h1. The liquid fuel trapped in the separation chambers S1 and S2 returns to the tank main body 10, for example, through return grooves E1 and E2 (see FIGS. 14A and 14B) described below. On other hand, the separation chambers S1 and S2 allow vapor to flow towards the breather hole h1.

As described above, the fuel tank 1 includes two channels connecting the breather hole h1 and the tank main body 10. That is, the fuel filler neck 20 includes the channel between the outer surface of the upper cylindrical portion 41 and the inner surface of the fuel filler neck 20, and further includes the channel between the outer surface of the lower cylindrical portion 43 and the lower end of the inner surface of the fuel filler neck 20. This structure smooths the flow of vapor, compared with a structure including a single channel. The number of channels is not limited to two. For example, a channel may be provided between the outer surface of the upper cylindrical portion 41 and the inner surface of the fuel filler neck 20, whereas no channel may be provided between the outer surface of the lower cylindrical portion 43 and the inner surface of the fuel filler neck 20A. Conversely, a channel may be provided between the outer surface of the lower cylindrical portion 43 and the inner surface of the fuel filler neck 20, whereas no channel may be provided between the outer surface of the upper cylindrical portion 41 and the inner surface of the fuel filler neck 20.

The separation chambers S1 and S2 are partitioned from the space inside the tank main body 10. "Separation chambers S1 and S2 are partitioned from the space in the tank main body 10" indicates that each of the channels from the main tank body 10 to the separation chambers S1 and S2 includes a structure that narrows the channel in the middle thereof. In the example of the fuel tank 1, the gap between the upper cylindrical portion 41 and the inner surface of the fuel filler neck 20 partitions the separation chambers S1 and S2 from the tank main body 10. In detail, the width D1 of the gap in the radial direction of the filler opening F is smaller than the widths of the separation chambers S1 and S2 in the radial direction of the filler opening F. Similarly, the gap between the outer surface of the lower cylindrical portion 43 and the inner surface of the fuel filler neck 20 partitions the separation chambers S1 and S2 from the tank main body 10. In detail, the width D2 of the gap in the radial direction of the filler opening F is smaller than the widths of the separation chambers S1 and S2 in the radial direction of the filler opening F.

As shown in FIG. 6, the filler cap 30 includes a cylindrical wall 33 extending downward from an upper end 32 covering the filler opening F. The cylindrical wall 33 is located inside the upper cylindrical portion 41 of the inner cylindrical member 40 in a state where the filler cap 30 is attached to the fuel filler neck 20. The lower end of the cylindrical wall 33 is positioned below the upper end of the upper cylindrical portion 41. Therefore, the cylindrical wall 33 overlaps the upper cylindrical portion 41 when viewed in the radial direction of the fuel filler neck 20. A slight gap is provided between the outer surface of the cylindrical wall 33 and the inner surface of the upper cylindrical portion 41. This structure bends the vapor channel from the tank main body 10 to the first separation chamber S1 and thus further reduces the amount of liquid fuel flowing into the first separation chamber S1.

The first separation chamber S1 and the second separation chamber S2 are preferably annular shaped and extend along the inner surface of the fuel filler neck 20. In the example of the fuel tank 1, the first separation chamber S1 and the second separation chamber S2 extend over the entire region in the circumferential direction (that is, extend over 360 degrees) around the center line C1 of the fuel filler neck 20. That is, as shown in FIG. 14A, the first middle cylindrical portion 42a defining the first separation chamber S1 extends over the entire region in the circumferential direction around the center line C1 of the fuel filler neck 20. Similarly, the second middle cylindrical portion 42b defining the second separation chamber S2 extends over the entire region in the circumferential direction around the center line C1 of the fuel filler neck 20. This ensures a sufficient volume for the separation chambers S1 and S2. The structures of the separation chambers S1 and S2 are not limited to the example of fuel tank 1. The separation chambers S1 and S2 may be provided only in a partial region in the circumferential direction around the center line C1 of the fuel filler neck 20 (that is, over an angle smaller than 360 degrees).

As described above, the breather hole h1 opens at the first separation chamber S1. As shown in FIG. 7, the lower end (bottom) of the first separation chamber S1 is positioned below the lower end of the edge of the breather hole h1. The upper end of the first separation chamber S1 is positioned above the upper end of the edge of the breather hole h1. This facilitates the flow of vapor near the breather hole h1. Also, since the breather hole h1 is positioned above the bottom of the first separation chamber S1, liquid fuel is prevented from entering the breather hole h1 even when the liquid fuel temporarily remains in the first separation chamber S1. In the example of the fuel tank 1, the lower end of the first separation chamber S1 is defined by the partition 42c described above. The upper surface of the partition 42c is positioned below the lower end of the edge of the breather hole h1. The upper end of the first separation chamber S1 is defined by the upper edge 42d of the middle cylindrical portion 42. The upper edge 42d of the middle cylindrical portion 42 is located above the breather hole h1.

The cross-sectional area of the first separation chamber S1 is preferably larger than the cross-sectional area of the connector tube 21 in the breather channel. This enables a sufficient amount of liquid fuel to be temporarily stored in the first separation chamber S1. In other words, this prevents the liquid fuel from flowing into the breather hole h1 through the first separation chamber S1. In this specification, the cross-sectional area of the first separation chamber S1 is the area of the cross section taken along a plane extending through the center line C1 of the fuel filler neck 20. In the example of the fuel tank 1, since the first separation chamber S1 is annular shaped, the first separation chamber S1 includes two cross sections on the left and right sides of the inner cylindrical member 40 as shown in FIG. 6. In this specification, the cross-sectional area of the first separation chamber S1 refers to the sum of the cross sections of the first separation chamber S1 obtained on the right and left sides of the inner cylindrical member 40. Alternatively, each of the cross sections of the first separation chamber S1 on the right and left sides may be larger than the cross-sectional area of the connector tube 21. The cross-sectional area of the connector tube 21 in the present specification is an area of the cross section taken along a plane that is perpendicular to the longitudinal direction of the connector tube 21.

The outer surface of the first middle cylindrical portion 42a and the inner surface of the fuel filler neck 20 are separated from each other in the radial direction of the filler opening F. The distance between the first middle cylindrical portion 42a and the inner surface of the fuel filler neck 20 is larger than the gap between the outer surface of the upper cylindrical portion 41 and the inner surface of the fuel filler neck 20 and larger than the gap between the outer surface of the lower cylindrical portion 43 and the inner surface of the fuel filler neck 20. Thus, the first separation chamber S1 is located between the first middle cylindrical portion 42a and the inner surface of the fuel filler neck 20.

In the example of the fuel tank 1, the outer diameter of the first middle cylindrical portion 42a is smaller than the outer diameter of the upper cylindrical portion 41. Therefore, the outer surface of the middle cylindrical portion 42 bends toward the inside of the fuel filler neck 20 from the lower edge of the upper cylindrical portion 41 to be connected to the first middle cylindrical portion 42a. The bending of the middle cylindrical portion 42 defines the first separation chamber S1 between the first middle cylindrical portion 42a and the inner surface of the fuel filler neck 20. Contrary to the example of the fuel tank 1, the inner surface of the fuel filler neck 20 may bend outward in the radial direction so that it is spaced apart from the outer surface of the inner cylindrical member 40. The bending of the inner surface of the fuel filler neck 20 may define the first separation chamber S1 between the inner surface of the fuel filler neck 20 and the inner cylindrical member 40.

As shown in FIG. 7, in the example of the fuel tank 1, the middle cylindrical portion 42 includes an inclined portion 42*f* extending diagonally from the lower edge of the upper cylindrical portion 41 toward the upper edge of the first middle cylindrical portion 42*a*. Specifically, the inclined portion 42*f* extends diagonally downward from the lower edge of the upper cylindrical portion 41 toward the center line C1 of the fuel filler neck 20. When a user pours fuel into the fuel tank 1 through a fuel hose, the nozzle of the fuel hose is inserted inside the inner cylindrical member 40. When the nozzle of the fuel hose contacts the inclined portion 42*f*, the inclined portion 42*f* guides the nozzle toward the center of the filler opening F.

As shown in FIG. 7, the inner surface of the fuel filler neck 20 includes a projection 22 thereon that projects toward the inside of the fuel filler neck 20. The projection 22 is located in a lower portion of the fuel filler neck 20. The inner cylindrical member 40 includes a partition 42*c*. The partition 42*c* is located on the upper side of the projection 22. More specifically, the upper portion 42*g* (see FIG. 14A) of the partition 42*c* is located on the upper side of the projection 22 of the fuel filler neck 20. The upper portion 42*g* is also preferably annular shaped. This structure bends the vapor channel between the outer surface of the inner cylindrical member 40 and the inner surface of the fuel filler neck 20. As a result, it is possible to further reduce the liquid fuel passing between the partition 42*c* and the inner surface of the fuel filler neck 20 from reaching the first separation chamber S1. Also, the partition 42*c* and the projection 22 prevent the inner cylindrical member 40 from dropping into the tank main body 10. The lower portion 42*h* of the partition 42*c* is located inside the projection 22.

As described above, in the example of the fuel tank 1, the first separation chamber S1 extends over the entire region in the circumferential direction around the center line C1 of the fuel filler neck 20. Like the first vapor-liquid separation chamber S1, the projection 22 of the fuel filler neck 20 and the partition 42*c* of the inner cylindrical member 40 are annular shaped and extend around the center line C1 of the fuel filler neck 20.

As described above, the second separation chamber S2 is spaced apart from the breather hole h1 in the direction along the center line C1 of the fuel filler neck 20. In the example of the fuel tank 1, the second separation chamber S2 is located below the height of the breather hole h1 and is located below the first separation chamber S1.

The second separation chamber S2 is located between the lower portion of the middle cylindrical portion 42 and the inner surface of the fuel filler neck 20. More specifically, the second separation chamber S2 is located between the second middle cylindrical portion 42*b* and the inner surface of the fuel filler neck 20. In the example of the fuel tank 1, the first separation chamber S1 and the second separation chamber S2 are partitioned by the partition 42*c*, and the upper end of the second separation chamber S2 is defined by the partition 42*c*.

The second middle cylindrical portion 42*b* is spaced apart from the inner surface of the fuel filler neck 20 in the radial direction of the filler opening F. The distance between the second middle cylindrical portion 42*b* and the inner surface of the fuel filler neck 20 is larger than the gap between the outer surface of the lower cylindrical portion 43 and the inner surface of the fuel filler neck 20 and is larger than the gap between the outer surface of the upper cylindrical portion 41 and the inner surface of the fuel filler neck 20. This structure secures the second separation chamber S2 between the second middle cylindrical portion 42*b* and the inner surface of the fuel filler neck 20.

In the example of the fuel tank 1, the outer diameter of the second middle cylindrical portion 42*b* is smaller than the outer diameter of the lower cylindrical portion 43. The lower edge of the middle cylindrical portion 42 bends toward the inside of the fuel filler neck 20 from the upper edge of the lower cylindrical portion 43 to be connected to the second middle cylindrical portion 42*b*. This bending of the middle cylindrical portion 42 secures the second separation chamber S2 between the second middle cylindrical portion 42*b* and the inner surface of the fuel filler neck 20. Contrary to the example of the fuel tank 1, the inner surface of the fuel filler neck 20 may bend outward in the radial direction of the filler opening F to be spaced apart from the outer surface of the inner cylindrical member 40. Accordingly, the second separation chamber S2 may be located between the inner surface of the fuel filler neck 20 and the inner cylindrical member 40.

A return channel that returns liquid fuel flowing into the vapor-liquid separation chambers S1 and S2 to the tank main body 10 is provided between the outer surface of the inner cylindrical member 40 and the inner surface of the fuel filler neck 20. For example, a groove that returns the liquid fuel flowing into the separation chambers S1 and S2 to the tank main body 10 (this groove is referred to as a "return groove") is provided on at least one of the outer surface of the inner cylindrical member 40 and the inner surface of the fuel filler neck 20. In the example of the fuel tank 1, as shown in FIG. 14A, a first return groove E1 connecting the first separation chamber S1 and the second separation chamber S2 is provided on the outer surface of the partition 42*c* of the inner cylindrical member 40. The first return groove E1 extends in the longitudinal direction of the inner cylindrical member 40, that is, extends along the center line C1 of the fuel filler neck 20. Also, as shown in FIG. 14B, a second return groove E2 extending downward from the second middle cylindrical portion 42*b* is provided on the outer surface of the lower cylindrical portion 43. The two return grooves E1 and E2 define and function as a channel to return the liquid fuel flowing into the vapor-liquid separation chambers S1 and S2 to the tank main body 10.

As shown in FIGS. 14A and 14B, an end e1 on the second middle cylindrical portion 42*b* side of the first return groove E1 and an end e2 on the second middle cylindrical portion 42*b* side of the second return groove E2 are spaced apart from each other in the circumferential direction of the inner cylindrical member 40 (the end e1 is the opening of the first return channel E1 and the end e2 is the opening of the second return channel E2). This structure prevents liquid fuel in the tank main body 10 from flowing into the first separation chamber S1 through the return grooves E1 and E2. In the example of the fuel tank 1, the end e1 of the first return groove E1 is located on the opposite side of the end e2 of the second return groove E2 across the center of the inner cylindrical member 40. That is, the opening to the second separation chamber S2 of the first return groove E1 is shifted by 180 degrees, for example, from the opening to the second separation chamber S2 of the second return groove E2.

Note that the structure of the return channel is not limited to the example of the fuel tank 1. For example, a return groove defining and functioning as a return channel may be located on the inner surface of the fuel filler neck 20. Also, the return channel may be inclined to the center line C 1 of the fuel filler neck 20.

As shown in FIG. 6, the inner cylindrical member 40 extends downwardly toward the inside of the tank main body 10 beyond the lower end of the fuel filler neck 20 (that is, beyond the lower end 20*b* (see FIG. 6) between the tank main body 10 and the fuel filler neck 20). In other words, the lower cylindrical portion 43 of the inner cylindrical member 40 extends downward beyond the lower surface (inner surface) of the upper wall 10a of the tank main body 10. When an operator supplies fuel to the fuel tank 1 through the filler opening F, the liquid level of fuel gradually increases in tank main body 10. FIG. 6 shows two dot-chain lines L1 and L2 that exemplify liquid levels of fuel. When the liquid level L2 of fuel reaches the lower end of the lower cylindrical portion 43, a space Sf enclosed by the liquid surface and the inner surface of the tank main body 10 exists around the lower cylindrical portion 43. Since the gap between the outer surface of the inner cylindrical member 40 and the inner surface of the fuel filler neck 20 is narrow, vapor in the space Sf does not immediately flow to the breather hole h1. Therefore, the liquid level L2 in the space Sf does not rise at a speed corresponding to the supply speed of the fuel. Therefore, after the fuel level L2 reaches the lower end of the lower cylindrical portion 43, the fuel level L1 inside the inner cylindrical member 40 rises faster than before. This change in the rising speed of the liquid level makes the operator notice that the fuel has been sufficiently supplied to the tank main body 10, that is, that the fuel has reached the maximum amount.

As described above, the inner cylindrical member 40 that alerts the operator of the fact that fuel has been sufficiently supplied to the tank main body 10 is used to provide the separation chambers S1 and S2. Accordingly, the number of parts of the fuel tank 1 is reduced. The shape and structure of the inner cylindrical member 40 is not limited to the example of the fuel tank 1. For example, the lower cylindrical portion 43 may not include a portion extending downward beyond the lower surface of the upper wall 10a of the tank main body 10.

As shown in FIGS. 14A and 14B, holes h2 and h3 penetrating the middle cylindrical portion 42 are provided in the middle cylindrical portion 42. In the example of the fuel tank 1, two through holes h2 and h3 are provided in the first middle cylindrical portion 42a. As described above, after the liquid level L2 of the fuel reaches the lower end of the inner cylindrical member 40, a difference is caused between the height of the liquid level L1 inside the inner cylindrical member 40 and the height of the liquid level L2 outside the inner cylindrical member 40. At this time, since the air in the space Sf is discharged to the outside through the through holes h2 and h3, the difference between the height of the liquid surface L1 inside the inner cylindrical member 40 and the height of the liquid surface L2 outside the inner cylindrical member 40 is reduced in a short time. In the example of the fuel tank 1, as shown in FIG. 14A, a hole h4 penetrating the second middle cylindrical portion 42b is also provided in the second middle cylindrical portion 42b. Therefore, the air in the space Sf is discharged to the outside through the through hole h4. The through hole h4 may not be included.

As shown in FIGS. 14A and 14B, projections 43a and 43b are provided on the outer surface of the lower cylindrical portion 43 of the inner cylindrical member 40. The protrusions 43a and 43B engage, for example, the lower end 20b of the fuel filler neck 20 to prevent the inner cylindrical member 40 from dropping from the fuel filler neck 20.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A four-wheel vehicle comprising:
right and left front wheels;
right and left rear wheels;
a vehicle frame;
a seat that a driver sits on;
an engine at least a portion of which is located farther forward than the seat;
a fuel tank located above the engine and forwardly of the seat;
a fuel filler including a fuel filler neck of the fuel tank and a filler cap that closes a filler opening of the fuel filler neck;
a breather channel connected to the fuel filler; and
an outflow prevention valve in the breather channel to prevent outflow of liquid fuel; wherein
the outflow prevention valve is located, in a side view of the vehicle, above both of a lower end of the fuel tank and an upper end of the engine.

2. The four-wheel vehicle according to claim 1, wherein the outflow prevention valve includes an inlet port into which vaporized fuel flows from the fuel tank, and an outlet port from which the vaporized fuel flows; and
at least the outlet port is located above a liquid level of liquid fuel when the liquid fuel is filled to a maximum amount in the fuel tank.

3. The four-wheel vehicle according to claim 1, wherein the outflow prevention valve includes an inlet port into which vaporized fuel flows from the fuel tank, and an outlet port from which the vaporized fuel flows; and
at least the outlet port is located above a center of the fuel tank in an up-and-down direction of the vehicle.

4. The four-wheel vehicle according to claim 1, wherein the outflow prevention valve includes an inlet port into which vaporized fuel flows from the fuel tank, and an outlet port from which the vaporized fuel flows; and
at least the outlet port is located above a lowest portion of an upper surface of the seat.

5. The four-wheel vehicle according to claim 1, wherein the outflow prevention valve is located farther leftward than a right end of the fuel tank and is farther rightward than a left end of the fuel tank.

6. The four-wheel vehicle according to claim 1, further comprising a steering bar that steers the front wheels; wherein
the outflow prevention valve is located below the steering bar.

7. The four-wheel vehicle according to claim 1, further comprising a steering system supporting a steering bar that steers the front wheels; wherein
the outflow prevention valve is mounted on the steering system.

8. The four-wheel vehicle according to claim 7, wherein the outflow prevention valve is mounted on a portion of the steering system that rotates together with the steering bar.

9. The four-wheel vehicle according to claim 7, wherein the steering system includes a steering column and a support rotatably supporting the steering column; and
the outflow prevention valve is mounted on the support.

10. The four-wheel vehicle according to claim 1, wherein the outflow prevention valve is mounted on one of a portion of the vehicle frame located farther forward than the fuel tank and a carrier located farther forward than the fuel tank.

11. The four-wheel vehicle according to claim 1, wherein the outflow prevention valve is mounted on one of a portion of the vehicle frame located farther rearward than the fuel tank and a carrier located farther rearward than the fuel tank.

12. The four-wheel vehicle according to claim 1, wherein the vehicle frame includes a tank support frame supporting the fuel tank; and the outflow prevention valve is mounted on the tank support frame.

13. The four-wheel vehicle according to claim 1, further comprising a canister installed on the breather channel; wherein the canister is located at a position downstream of the outflow prevention valve and below the outflow prevention valve.

14. The four-wheel vehicle according to claim 13, wherein the canister is located below an upper end of the engine.

15. A four-wheel vehicle comprising:
right and left front wheels;
right and left rear wheels;
a vehicle frame;
a seat that a driver sits on;
an engine at least a portion of which is located farther forward than the seat;
a fuel tank located above the engine and forwardly of the seat;
a fuel filler including a fuel filler neck of the fuel tank and a filler cap that closes a filler opening of the fuel filler neck;
a breather channel connected to the fuel filler; and
an outflow prevention valve in the breather channel to prevent outflow of liquid fuel; wherein
the outflow prevention valve is mounted on the fuel tank.

16. The four-wheel vehicle according to claim 15, wherein the fuel tank is made of a resin.

17. The four-wheel vehicle according to claim 15, wherein the breather channel includes a breather tube;
the fuel filler includes a connector tube connected to the breather tube; and
the breather tube extends from the connector tube to the outflow prevention valve and extends over at least 180 degrees around the fuel filler.

18. The four-wheel vehicle according to claim 15, wherein the breather channel includes a breather tube;
the fuel filler includes a connector tube connected to the breather tube; and
the fuel filler includes a guide portion that holds the breather tube.

19. The four-wheel vehicle according to claim 15, wherein the breather channel includes a breather tube;
the fuel filler includes a connector tube connected to the breather tube;
the connector tube extends from the fuel filler in a radial direction of the fuel filler; and
a distal end of the connector tube is positioned above a proximal portion of the connector tube.

20. The four-wheel vehicle according to claim 15, wherein the outflow prevention valve includes an inlet port into which vaporized fuel flows from the fuel tank, an outlet port from which the vaporized fuel flows, and located such that the outlet port is positioned above the inlet port.

21. A four-wheel vehicle comprising:
right and left front wheels;
right and left rear wheels;
a vehicle frame;
a seat that a driver sits on;
an engine at least a portion of which is located farther forward than the seat;
a fuel tank located above the engine and forwardly of the seat;
a fuel filler including a fuel filler neck of the fuel tank and a filler cap that closes a filler opening of the fuel filler neck;
a vapor-liquid separation chamber inside the fuel filler and partitioned from a fuel storage space of the fuel tank;
a breather channel connected to the vapor-liquid separation chamber; and
an outflow prevention valve in the breather channel to prevent outflow of liquid fuel.

22. The four-wheel vehicle according to claim 21, further comprising a breather hole at an inner surface of the fuel filler neck; wherein
the breather channel opens inside the fuel filler neck through the breather hole;
the breather channel extends from the fuel filler neck in a radial direction of the fuel filler neck; and
the vapor-liquid separation chamber extends along the inner surface of the fuel filler neck.

23. The four-wheel vehicle according to claim 22, further comprising a cylindrical member inside the fuel filler neck; wherein
the vapor-liquid separation chamber is defined by the cylindrical member and the inner surface of the fuel filler neck.

* * * * *